United States Patent [19]
McGregor et al.

[11] Patent Number: 5,892,621
[45] Date of Patent: *Apr. 6, 1999

[54] LIGHT REFLECTANT SURFACE FOR LUMINAIRES

[75] Inventors: Gordon L. McGregor, Landenberg, Pa.; Raymond B. Minor, Elkton, Md.; Gregory E. Hannon, Newark, Del.

[73] Assignee: W. L. Gore & Associates, Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 630,243

[22] Filed: Apr. 10, 1996

Related U.S. Application Data

[63] Continuation-in-part of Ser. No. 369,850, Jan. 6, 1995, Pat. No. 5,596,450.

[51] Int. Cl.$^6$ .............................. G02B 5/02; G02B 1/10; B29C 61/00; H01S 3/093
[52] U.S. Cl. ......................... 359/599; 359/599; 359/584; 359/589; 523/135; 362/260; 362/290
[58] Field of Search ..................................... 359/599, 584, 359/589; 523/135; 362/260, 290

[56] References Cited

U.S. PATENT DOCUMENTS

| | | | |
|---|---|---|---|
| 3,863,246 | 1/1975 | Treka et al. | 340/324 R |
| 3,953,566 | 4/1976 | Gore | 264/288 |
| 3,962,153 | 6/1976 | Gore | 260/2.5 R |
| 4,035,085 | 7/1977 | Seiner | 356/179 |
| 4,096,227 | 6/1978 | Gore | 264/210 R |
| 4,152,618 | 5/1979 | Abe et al. | 313/116 |
| 4,187,390 | 2/1980 | Gore | 174/102 R |
| 4,354,741 | 10/1982 | Mano et al. | 350/357 |
| 4,463,045 | 7/1984 | Ahr et al. | 428/131 |
| 4,504,889 | 3/1985 | Goldfarb | 362/200 |
| 4,518,722 | 5/1985 | Schutt et al. | 523/135 |
| 4,523,319 | 6/1985 | Pfost | 372/54 |
| 4,764,932 | 8/1988 | Peterson et al. | 372/35 |
| 4,772,124 | 9/1988 | Wooten et al. | 356/218 |
| 4,805,181 | 2/1989 | Gibson et al. | 372/72 |
| 4,902,423 | 2/1990 | Bacino | 210/500.36 |

(List continued on next page.)

FOREIGN PATENT DOCUMENTS

| | | |
|---|---|---|
| 0313263 A3 | 4/1989 | European Pat. Off. . |
| 0372224 A3 | 6/1990 | European Pat. Off. . |

OTHER PUBLICATIONS

Robert D. Saunders and Henry J. Kostkowski, "Roughened Quartz Surfaces and Teflon as Small Angle Diffusers and Depolarizers between 200 and 400 nm," Applied Optics, vol. 28, No. 15, Aug 1, 1989, pp. 3242–3245.

Victor R. Weidner and Jack J. Hisa, "Reflection Properties of Pressed Polytetrafluoroethylene Powder," J. Opt. Soc. Am./ vol. 71 No. 7 Jul. 1981, pp. 856–861.

International Search Report for PCT/US96/15111.

Literature: "Janmar Lighting TM Energy Efficient Lighting Products," 16510/Jan, Buy Line 7935.

(List continued on next page.)

*Primary Examiner*—Cassandra Spyrou
*Assistant Examiner*—Mohammad Y. Sikder
*Attorney, Agent, or Firm*—David J. Johns

[57] ABSTRACT

The present invention relates to surfaces used to reflect light, and particularly to highly light reflectant surfaces that provide even diffusion of light for the purpose of maximizing light efficiency and/or uniformity in a luminaire. By employing an expanded polytetrafluoroethylene (PTFE) comprising a microstructure of polymeric nodes and fibrils, the material of the present invention demonstrates exceptional diffuse reflectivity across a wide spectrum of visible light. Additionally, the material of the present invention provides many properties that have been previously unavailable in highly diffuse reflective material, including a high degree of malleability, moldability and flexibility, and effective reflectivity even at relatively thin cross-sections.

12 Claims, 13 Drawing Sheets

U.S. PATENT DOCUMENTS

| | | | |
|---|---|---|---|
| 4,912,720 | 3/1990 | Springsteen | 372/72 |
| 5,051,878 | 9/1991 | Ngai | 362/299 |
| 5,075,827 | 12/1991 | Smith | 362/221 |
| 5,103,385 | 4/1992 | Federico et al. | 362/298 |
| 5,116,115 | 5/1992 | Lange et al. | 351/212 |
| 5,192,128 | 3/1993 | Ngai | 362/297 |
| 5,241,180 | 8/1993 | Ishaque et al. | 250/361 R |
| 5,263,042 | 11/1993 | Kojima et al. | 372/72 |
| 5,378,965 | 1/1995 | Dakin | 315/248 |
| 5,422,756 | 6/1995 | Weber | 359/487 |
| 5,462,705 | 10/1995 | Springsteen | 264/122 |
| 5,488,473 | 1/1996 | Springsteen et al. | 356/317 |

OTHER PUBLICATIONS

A. W. Springsteen, "A Novel Class of Lambertian Reflectance Materials for Remote Sensing Application," SPIE vol. 1109, Optical Radiation Measurements II (1989), pp. 133–141.

Carol J. Bruegge, Albert E. Stiegaman, Daniel R. Coulter, Robert R. Hale, David J. Diner, Reflectance Stability Analysis of Spectralon Diffuse Calibration Panels, SPIE vol. 1493 Calibration of Passive Remote.

"Reflectance Stability . . . Panels" (Cont'd) Observing Optical and Microwave Instrumentation (1991), pp. 132–142.

"Diffuse Reflectance Coatings and Materials," Labsphere (R), 1996 Catalog, pp. 32–43 T. K. Lewellen, R. S. Miyaoka, S. G. Kohlmyer, Improving the Performance of the SP–3000 PET Detector.

Modules, Journal: IEEE Transactions on Nuclear Science, V39, N4 (Aug), pp. 1074–1078.

S. Nutter, C. R. Bower, M. W. Gebhard, R. M. Heinz and G. Spiczak, "Sintered Halon as a diffuse reflecting liner for light integration boxes," Nuclear Instruments and Methods in Physics Research A310 (1991) 665–670.

PCT International Search Report for PCT/US95/03322.

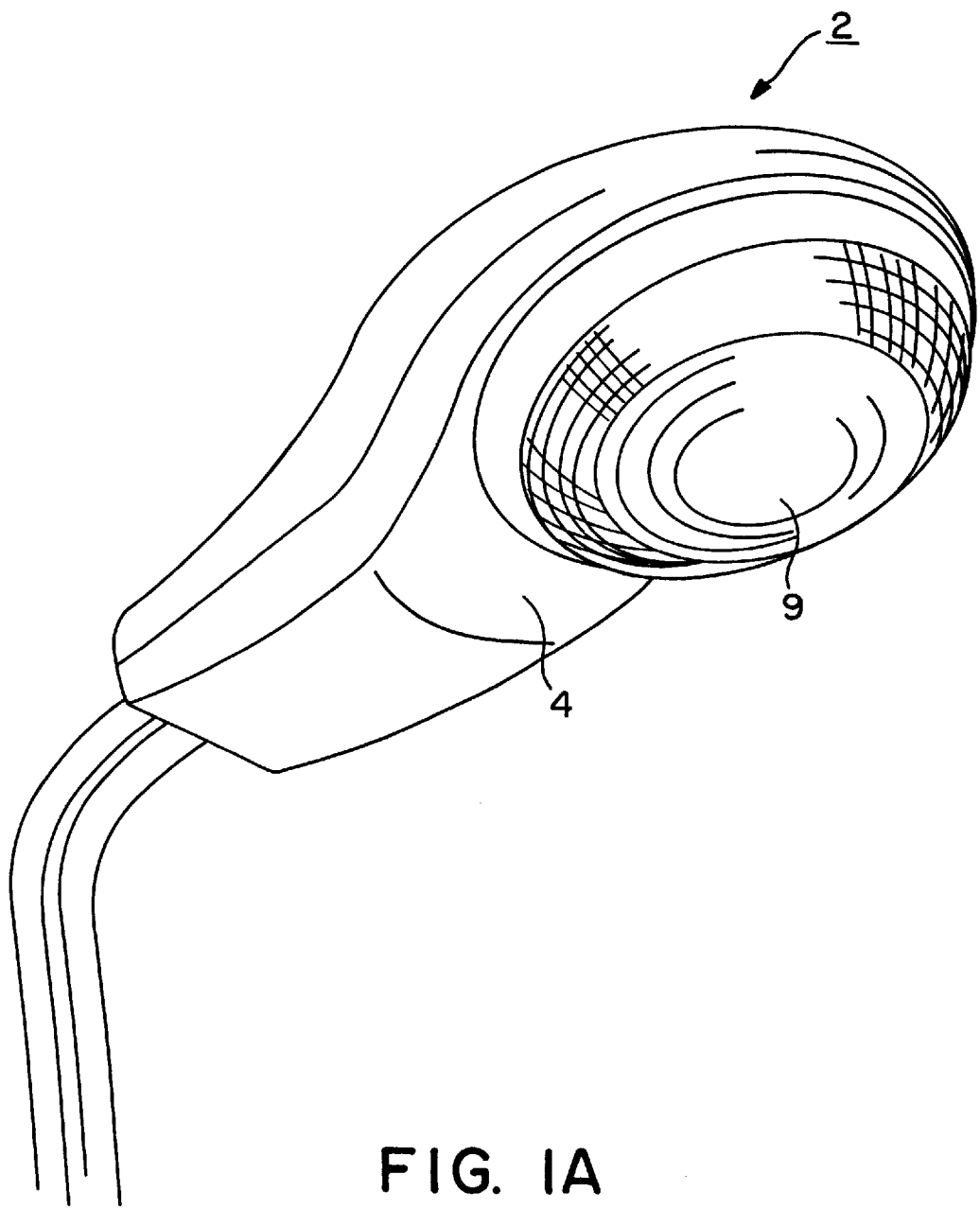
FIG. IA

LIGHT REFLECTANT SURFACE FOR LUMINAIRES

RELATED APPLICATIONS

The present application is a continuation-in-part of U.S. patent application Ser. No. 08/369,850, filed Jan. 6, 1995, now Patented, U.S. Pat. No. 5,596,450.

BACKGROUND OF THE INVENTION

1. Field of the Invention

The present invention relates to surfaces used to reflect light, and particularly to highly light reflectant surfaces that provide even diffusion of light for the purpose of maximizing efficiency and/or light uniformity.

2. Description of Related Art

The present invention generally relates to the field of lighting, and more particularly to luminaires which utilize a reflector for redirecting light. The term "luminaire" as used herein is meant to describe a complete lighting unit consisting of a lamp or lamps together with components designed to redirect and distribute light from the lamp(s), along with a housing which positions and protects the lamp(s) and components.

Luminaires can be categorized by numerous methods. Typically, there are indoor and outdoor luminaire applications. Indoor luminaires can be categorized by light output emitted above and below the horizontal. The Commission Internationale de l'Eclairage (CIE) has various luminaire classifications. These are direct, semidirect, general diffuse, semi-indirect, and indirect. Direct lighting defines light that is at least 90% below the horizontal. Semidirect lighting is predominantly downward at 60–90% of the light below the horizontal. General diffuse light describes output where the downward and upward components are about equal. Semi-indirect are predominantly upward with 60–90% of the light above the horizontal. Indirect lighting describes systems are those where 90–100% of the light is directed toward the ceiling and upper side walls. Within these categories, there are many applications. Some typical applications include recessed luminaires such as fluorescent troffers, incandescent downlighting, and high intensity discharge (HID) downlighting. There are also ceiling-mounted luminaires, track mounted, wall-mounted, suspended, and portable luminaires.

Outdoor luminaires can be categorized by similar methods. Light distribution of luminaires is categorized by the Illuminating Engineering Society of North America (IESNA) into five light distribution types. These range from narrow symmetrical distribution to wide non-symmetrical patterns. Some typical applications include pole-mounted luminaires, surface-mounted luminaires, bollard luminaires, and floodlight luminaires.

Other luminaire applications include luminaires for automotive lighting such as head lights, tail lights, daytime running lights, interior lights, instrument panel lights, etc. There are also unique applications such as backlights for liquid crystal displays and light boxes which can be used for a range of inspection needs such as x-ray viewers, tracing tables, etc.

Light sources which are used in the above listed luminaire applications include but are not limited to incandescent filament lamps, fluorescent lamps, high intensity discharge lamps (HID), arc lamps, electrodeless lamps, electroluminescent lamps, light-emitting diodes (LED), nuclear light sources, gaslights, etc.

In virtually all of the luminaire applications mentioned above, light is redirected by the use of a reflective material. The reflection characteristics of these materials can be described as being either specular, diffuse, or a combination thereof. While good mirrored surfaces can provide nearly perfect reflectivity of visible light, the light energy exiting these surfaces does so only at an angle equal to the incident angle of light contact. This type of reflection is referred to as specular reflectance. For many applications it is important that light be reflected with an even distribution of light from the surface. This latter property is referred to as diffuse or "lambertian" reflectance.

Throughout the years, reflective materials for luminaires have been studied, optimized, and specified. Specular materials are typically used in luminaires which are designed to preferentially deliver focused light to specific locations. Diffuse materials are more typically used for even dispersion of light having uniform characteristics without the undesirable high and low intensity light areas which are typically generated through the use of specular reflectors. This is desirable for many applications such as work and home locations where even lighting is preferred. Various methods of utilizing these type of diffuse reflectors are discussed, for example, in U.S. Pat. Nos. 5,192,128 and 5,378,965. There are also many designs which use both specular and diffuse materials to take advantage of both types of reflective characteristics, such as in U.S. Pat. Nos. 5,051,878 and 5,075,827.

In other applications a diffuse reflector coupled with a fresnel lens is utilized to create a uniform directed beam. This is discussed in U.S. Pat. No. 4,504,889.

In still other applications, a diffuse reflector is used in conjunction with diffusers, lenses, or louvers to preferentially direct the light emitting from the luminaire to specific areas. A diffuser scatters the light exiting the luminaire. A lens typically incorporates a series of prisms to preferentially light specific areas of its field of view. A louver is an array of open cells, the walls of which form reflectors. Any of these diffusers, lenses, or louvers can be utilized to redirect light in a wide range of applications such as 2×4 foot fluorescent troffers as well as low and high bay HID warehouse luminaires.

Due to the many requirements, the diffuse reflective material choices are relatively few. The most commonly used diffuse reflective materials are diffuse aluminum, white synthetic enamel paint, and white porcelain enamel paint. According to the Illuminating Engineering Society of North America, these three materials exhibit the highest diffuse reflectance through the listed visible wavelengths of 400 nm, 500 nm, and 600 nm. In these wavelengths, diffuse aluminum ranges from 75–84% reflection, white synthetic enamel paint ranges from 48–85% reflection, and white porcelain enamel paint ranges from 56–84% reflection.

Under these criteria, these typical diffuse reflective materials have a visible reflectance maximum of only 85%. At this reflectance level, 15% of the light which impinges upon the reflector is not utilized. Furthermore, in many applications which use diffuse reflectors, there can be additional loss of light stemming from the multiple reflections which are inherently created with diffuse reflective materials. Depending upon the design of the luminaire and the reflector geometry, there can be as many as fifteen or more multiple reflections of a ray of light before it exits the luminaire. At each reflection point, there is a cumulative loss of light associated with the reflection efficiency of the material. Thus an increase of reflectance efficiency of only a few percent can yield an overall luminaire output increase of as much as 10% to 20% or higher.

It is further evident that the percent reflection of each material listed varies significantly within its own measured visible wavelengths of 400 nm, 500 nm and 600 nm. This variation can introduce an undesirable color shift between the incident and reflected light. Thus the optimum diffuse reflective material for luminaire applications is one that has consistently high reflectance throughout the visible spectrum.

Due to the many different applications that exist for reflectant materials, it is not surprising that there are many different commercially available products with a variety of diffuse reflective properties. Until the present invention, the highest reflectance material known with excellent diffuse reflectivity was that described in U.S. Pat. No. 4,912,720 and sold under the trademark SPECTRALON by Labsphere, Inc., North Sutton, N.H. This material comprises lightly packed granules of polytetrafluoroethylene that has a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved with this material, with reflectance over previously available reflectant material increasing from 97% to better than 99%.

Despite the reported advantages of SPECTRALON material, it is considered quite deficient in many respects. First, this material comprises a relatively hard block of material that must be carefully carved or machined to desired shapes and dimensions and it is only available in a maximum size of 30.5 cm×30.5 cm. This severely limits how and where this material can be used and greatly increases the cost of using this material in many applications, especially where large single piece reflectors are desired. Therefore, where a pliable material is desired (such as with reflectors for fluorescent troffers), the SPECTRALON material plainly is inadequate. Furthermore, the additional machining process provides yet another source for contamination that can be detrimental to its reflective properties.

Second, the SPECTRALON material is apparently limited, both structurally and in its ability to reflect light, to a relatively thick minimum depth (i.e., a thickness of greater than 4 mm). Again, this serves to limit where and how this material can be used. Moreover, this limitation tends needlessly to increase both the amount of material required for a given application as well as the weight of the material required for such application.

Third, the SPECTRALON material is apparently relatively expensive to manufacture and purchase. These costs are only increased by the material's difficulty in processing into the final shape from the hard form (i.e., excessive amounts of material may have to be machined away and discarded during production) and its minimum thickness requirements. As a result, the SPECTRALON material is too expensive to be used in many applications that might otherwise benefit from its reflective properties.

Other materials currently used for coating reflective cavities are reflective paints or coatings based on barium sulfate, magnesium oxide, aluminum oxide, titanium oxide, and other white powders. One such example is Kodak White Reflectance coating No. 6080 which is available from Scientific Imaging Systems of Eastman Kodak Co., Rochester, N.Y. This coating is a specially prepared composition of barium sulfate, binder, and solvent. Despite good initial diffuse reflectance, this material maintains its reflectance properties for only a limited period of time (e.g., for only about six months) under normal atmospheric conditions. The material is expected to be stable for even shorter periods of time when exposed to high intensity ultraviolet radiation. Furthermore, application of this coating is extremely laborious requiring 4–8 coats to ensure an adequate thickness for best reflectance. Storage, preparation, and application of the material also requires special care. Even after all of the necessary steps for application, it still does not guarantee uniform results.

Accordingly, there is a distinct need for a highly diffuse reflective surface that can be easily handled and installed and provide other distinct advantages over existing reflective surfaces used in luminaires.

SUMMARY OF THE INVENTION

The present invention relates to surfaces used to reflect light, and particularly to highly light reflectant surfaces that provide even diffusion of light for the purpose of maximizing light efficiency and/or uniformity in a luminaire.

The present invention employs a reflectant material of expanded polytetrafluoroethylene (PTFE) comprising polymeric nodes interconnected by fibrils defining a microporous structure. It has been determined that this structure provides extremely high diffuse reflectivity, with significantly better than the 85% reflectance of materials currently used in luminaires. Using the present invention, reflectance levels of greater than 90% and even 95% are easily achieved. In fact, the material of the present invention has demonstrated higher diffuse reflectivity than the best diffuse reflective materials presently available. This high reflectance can be exploited by either utilizing the increased luminance or by reducing the energy input necessary to maintain the same luminance. This can be accomplished by reducing the wattage or number of lamps in the luminaire. By reducing the energy input, a significant long-term cost savings can be realized.

Equally important, the material employed in the present invention demonstrates many other properties that make it particularly desirable for use as a reflectant material for luminaires. First, the material is highly flexible, allowing easy installation into existing planar and non-planar luminaire reflector designs. Also, the material is easily diecut, allowing a piece to be sized to the appropriate dimensions using clean and efficient methods. Furthermore, the material used in the present invention demonstrates superior reflectant properties even at relatively thin thicknesses such as less than 1.0 mm, 0.5 mm, 0.25 mm and even less than 0.1 mm in thickness.

The material of the present invention is also very stable over time with respect to a wide range of environmental conditions such as temperature extremes (−268° C. to +288° C.). This property enables the reflective material of the present invention to be placed in close proximity and even in contact with high temperature light sources. The material of the present invention is chemically inert, withstanding most manufacturing and end use corrosive chemical environments ranging from 0–14 pH. Furthermore, the material of the present invention resists change or degradation due to exposure to ultraviolet radiation, making it ideally suitable for virtually any indoor or outdoor applications.

An additional advantage of the present invention is that the base material, expanded PTFE (ePTFE), can provide an excellent gasket suitable for luminaires. Thus a one piece reflector and gasket can be provided. Furthermore, ePTFE has a very low dielectric property, which makes it a superior electrical insulation material. New lamp designs can take advantage of this reflective material to also insulate wiring from the metal parts of the luminaire.

DESCRIPTION OF THE DRAWINGS

The operation of the present invention should become apparent from the following description when considered in conjunction with the accompanying drawings, in which:

FIG. 1A is a three-quarter perspective view of a COBRA-type luminaire incorporating the present invention;

DETAILED DESCRIPTION OF THE INVENTION

The present invention generally relates to the field of lighting, and more particularly to luminaires which utilize a reflector for redirecting light. Luminaire is meant to describe a complete lighting unit consisting of a lamp or lamps together with components designed to redirect and distribute light from the lamp(s), along with a housing which positions and protects the lamps and components.

As the term "light" is used herein, it is intended to include any form of electromagnetic radiation, but especially that in the spectrum of visible light (400 to 700 nm wavelength) and through infrared (IR) light radiation (700 to greater than 2500 nm wavelength). For the present invention involving luminaires, the visible wavelengths are of the primary importance. It should be appreciated that the material of the present invention may be tailored to modify reflectance in particular bands of light energy through the use of coatings, fillers, or similar materials.

Figure 1B:
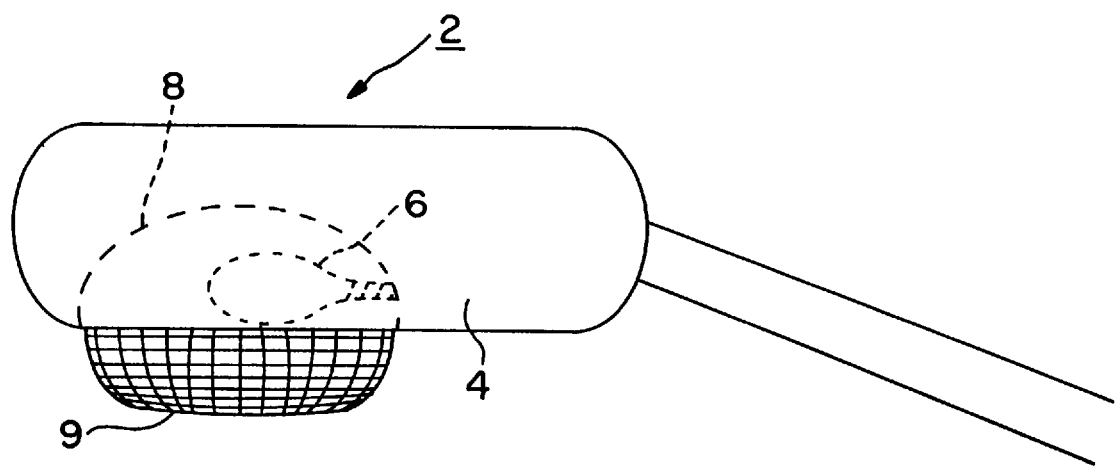
FIG. 1B is a side elevation view of a COBRA-type luminaire incorporating the present invention.

A typical luminaire 2, in this case a COBRA-type street lamp luminaire, is illustrated in FIGS. 1A and 1B. The luminaire 2 comprises a housing 4 and one or more light sources 6. A reflector 8 is normally provided to direct light in the desired direction. Often a shield, lens or other light permeable cover 9 is also provided to better shield the light source and/or to provide particular characteristics to the light exiting the housing. As is explained below, the heart of the present invention is the reflector 8 material. This material has numerous exceptional properties, as well as being as reflective or more reflective than any light reflective material available before the present invention.

Figure 2:
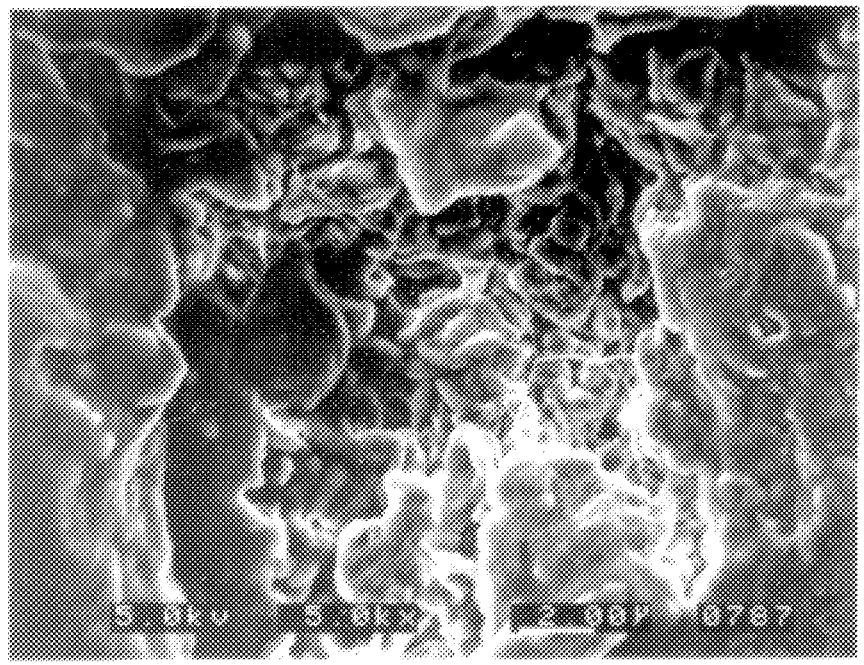
FIG. 2 is a scanning electron micrograph (SEM), enlarged 5000 times, showing the surface of a light reflectant material of a commercially available diffuse reflective material.

Prior to the present invention, the best diffuse reflectant material commercially available was sold under the trademark SPECTRALON by Labsphere, Inc., of North Sutton, N.H. This material comprises a granular polytetrafluoroethylene material that is lightly packed and then molded into a rigid block. FIG. 2 is a scanning electron micrograph (SEM) of a surface of a ½ inch (12.7 mm) thick reflectant sheet of SPECTRALON material. While this material provides good reflectivity of visible and near IR light, providing up to about 99% diffuse, "lambertian," reflectance over portions of that spectrum of light, the material has a number of drawbacks that constrain its use. Among the perceived problems with this material are: difficulty in processing due to its rigidity, especially where non-planar reflectant surfaces are required; limited range of effective light reflectance across visible and IR light spectrum; relatively thick minimum thicknesses (i.e., its effective reflectance diminishes at thicknesses of less than about 4 mm); and less than optimum diffuse reflectivity. Despite these deficiencies, this material is considered the present standard by which the diffuse reflectivity of all other materials is measured.

Figure 3:
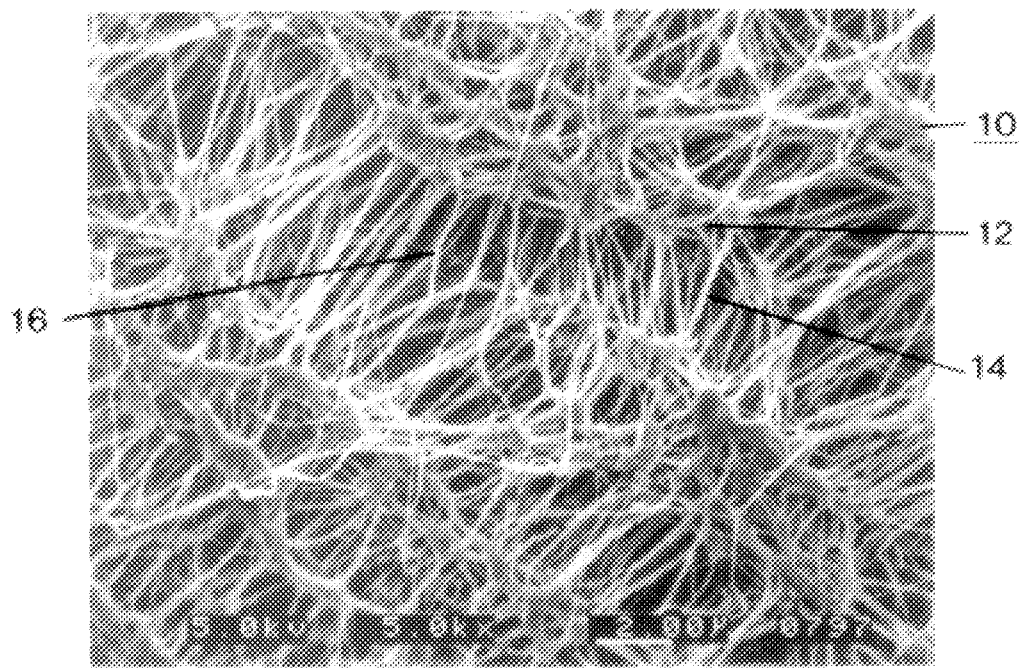
FIG. 3 is a SEM, enlarged 5000 times, showing the surface of one embodiment of a light reflectant material of the present invention.

The present invention employs a distinctly different material comprising an expanded polytetrafluoroethylene (PTFE), such as that made in accordance with U.S. Pat. Nos. 3,953,566, 3,962,153, 4,096,227, 4,187,390, and 4,902,423, all incorporated by reference. This expanded PTFE material comprises a microporous structure of microscopic polymeric fibrils (i.e., thread-like elements) interconnecting polymeric nodes (i.e., particles from which fibrils emerge). The structure of a biaxially expanded example of this material is shown in the SEM of FIG. 3. This material 10 comprises polymeric nodes 12 and numerous fibrils 14 extending from the nodes 12. As can be seen, numerous microporous voids 16 are provided within the material 10. As the term "expanded PTFE" is used herein, it is intended to include any PTFE material having a node and fibril structure, including in the range from a slightly expanded structure having fibrils extending from relatively large nodes of polymeric or other material, to an extremely expanded structure having fibrils merely intersect with one another at nodal points. As the terms "interconnected" or "interconnecting" are used herein to define the node and fibril structure of the expanded PTFE employed in the present invention, these terms are intended to define that the various nodes of the expanded PTFE structure are joined (that is, connected/ fastened) together by the thread-like fibril structures.

Expanded PTFE has a number of important properties that make it particularly suitable as a reflectant surface of the present invention. First, PTFE is a highly inert material that is hydrophobic. Accordingly, the material is resistant to both water and a wide variety of other materials that could damage some other reflectant surfaces. Additionally, by expanding PTFE in the manner taught by U.S. Pat. No. 3,953,566 to form the node and fibril structure, the material undergoes a significant increase in tensile strength and becomes highly flexible. Moreover, while packed granular based PTFE material provides good diffuse reflectant properties, it has been discovered that the node and fibril structure of expanded PTFE provides a much higher diffuse reflectance property.

A preferred reflectant material of the present invention is made in the following manner. A fine powder PTFE resin is blended with a lubricant, such as odorless mineral spirits, until a compound is formed. The volume of lubricant used should be sufficient to lubricate primary particles of the PTFE resin so as to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished by passing the dry coherent extrudate over a series of rotating heated rollers or heated plates at a temperature of between about 100° and 325° C., such as through the method taught in U.S. Pat. No. 3,953,566. Alternatively, the extruded sheet may be expanded in the manner described in U.S. Pat. No. 4,902,423 to Bacino, prior to removal of the lubricant.

In either case, the material may be further expanded at a ratio of 1:1.1 to 50:1 (with 5:1 to 35:1 being preferred) to form a final microporous sheet. Preferably the sheet is biaxially or multi-axially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 12 mm. Sheets can be subsequently layered upon themselves and subjected to temperatures ranging from about 300° C. to 400° C. while applying sufficient pressures to bond the layers together.

Figure 4:
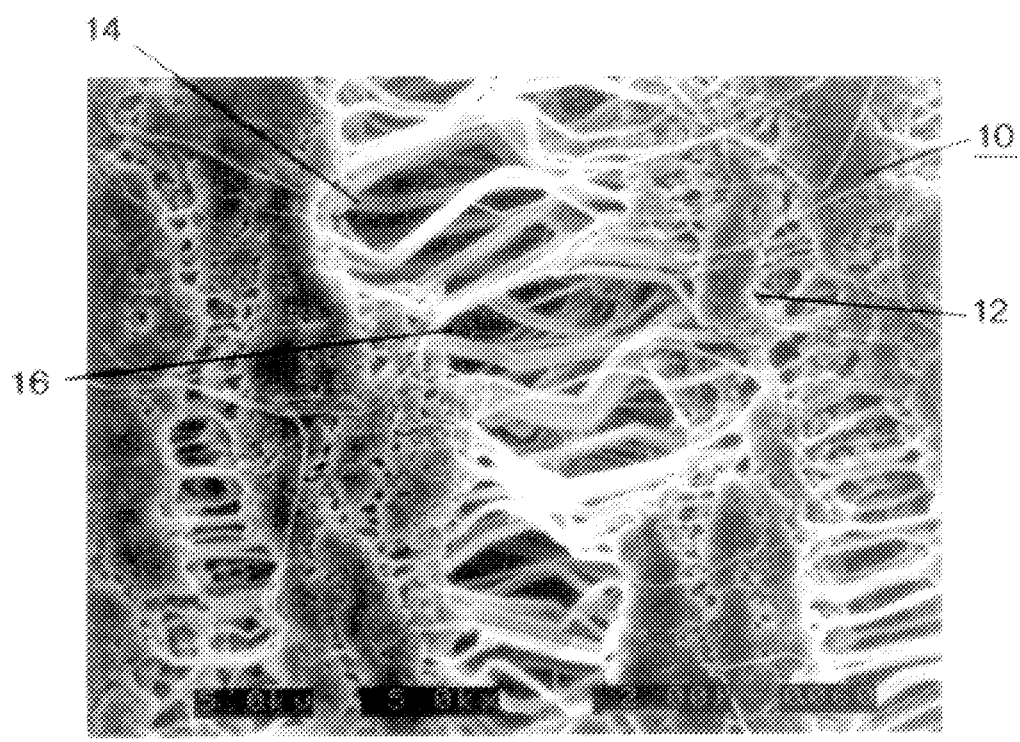
FIG. 4 is a SEM, enlarged 5000 times, showing the surface of another embodiment of a light reflectant material of the present invention.

It has been determined that by providing a microporous surface of polymeric nodes and fibrils, such as that of expanded PTFE, and particularly one that has been expanded in more than one direction, light is reflected off the node and fibril structure at a very high efficiency rate, with very even diffuse dispersion (i.e., diffusion) of the light. The SEM of FIG. 3 shows expanded PTFE material 10 that has undergone extensive expansion in two different directions. This structure exhibits a relatively "fine" structure with fibrils 14 oriented in both x and y directions, and small nodes 12 where the fibrils intersect. Still another embodiment of the present invention is shown in the SEM of FIG. 4. In this case, the expanded PTFE has been expanded in only the longitudinal direction. In this example there is a "coarser" structure characterized by larger nodes 12 and thicker fibrils 14. The fibrils 14 are oriented predominantly in a longitudinal direction.

As is explained in greater detail below, the present invention demonstrates extremely high diffuse reflectivity. When compared to the present reflectant standard of SPECTRALON material, the reflectant material of the present invention exhibited substantially higher diffuse reflectivity. Moreover, the reflectivity of the material of the present invention proved to have a number of other dramatically improved properties over the present standard. First, the reflectivity of the material remains high across a much wider spectrum of light wavelengths. Second, the material of the present invention demonstrates exceptional reflectivity even at much thinner profiles as compared with the existing standard material. Third, the material exhibits a very predictable, flat-line reflective response across a wide spectrum of light.

Figure 5:
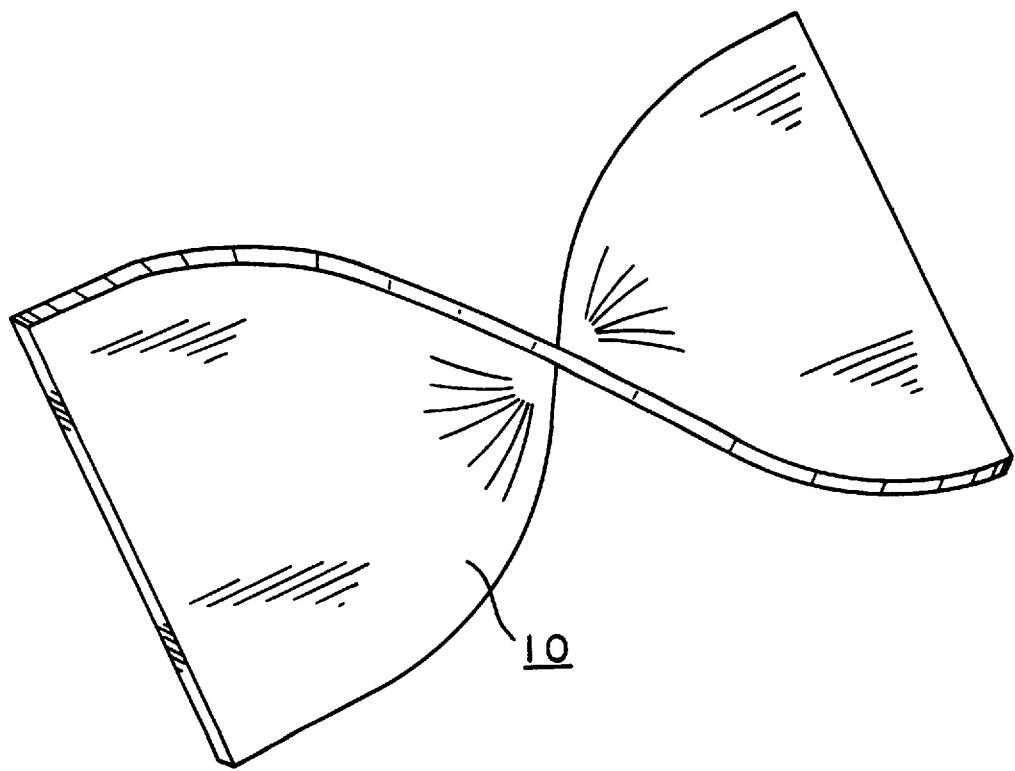
FIG. 5 is a three-quarter isometric view of a reflectant material of the present invention, wherein the flexibility of the material is demonstrated.

Another important improvement of the present invention is shown in FIG. 5. The reflectant material 10 of the present invention is highly malleable, moldable, and flexible, allowing it to be bent, twisted, curved, or otherwise formed into any suitable shape. In this respect, the reflectant material of the present invention is a dramatic improvement over previously available highly reflectant materials, such as SPECTRALON polytetrafluoroethylene reflectant materials that must be carved or machined into desired shapes. With the material of the present invention, a host of different non-planar shapes can be formed with minimal effort. These types of thin, flexible, formable materials having at least 95%, 90%, and even 85% reflectivity should have great value for a range of luminaires. The luminance output is dependent on many factors such as lamp wattage, number of lamps, luminaire design, etc., and careful consideration can be given to determine the level of reflectance required by the reflector.

It should also be noted that the material of the present invention may be modified through processing or additional fillers and/or coatings to provide high reflectance in one range of the light spectrum and absorbance in another range of the spectrum. For most luminaire applications it is believed desirable to provide a material with a reflectivity of at least 85% over a range of 400 to 700 nm.

The present invention may comprise single or multiple layers of expanded PTFE, or may comprise a laminate of one or more layers of expanded PTFE and a backing support material. Since the expanded PTFE membrane alone tends to be susceptible to stretching and distortion, for some applications it may be preferred that the membrane be mounted to a support layer, such as through lamination to a flexible woven or non-woven material, that will help maintain the shape of the image layer during use. One suitable support layer is applied by applying an adhesive material, such as moisture curable polyurethane or solvated polyurethane, to the expanded PTFE membrane and then applying the adhesive-coated expanded PTFE membrane to a flexible backing material (e.g., polyester, polypropylene, MYLAR®, KEVLAR®), nylon, etc.). The two materials can then be bonded to each other under applied pressure, such as by rolling the material between one or more pairs of nip rollers. With use of a moisture curable polyurethane adhesive to bond an expanded PTFE membrane to a woven fabric, such as nylon. The application of a pressure of about 1150 g per linear meter is sufficient to bond the materials together. The materials are then allowed to moisture cure for a period of about 48 hours before use.

In addition, to create complex shapes, an expanded PTFE sheet can be bonded to a rigid support material and then formed as a composite into shapes, such as parabolic or ellipsoidal domes. One suitable method for such forming techniques comprises using vacuum forming devices.

Without intending to limit the scope of the present invention, the following examples illustrate how the present invention may be made and used:

EXAMPLE 1

A reflectant material of the present invention was prepared in the following manner:

A fine powder PTFE resin was combined in a blender with odorless mineral spirits (ISOPAR K available from Exxon Corp.) until a compound was obtained. The volume of mineral spirits used per gram of fine powder PTFE resin was 0.275 cc/gm. The compound was compressed into a billet and extruded through a 1.14 mm gap die attached to a ram type extruder to form a coherent extrudate. A reduction ratio of 47:1 was used.

Subsequently, the odorless mineral spirit was volatized and removed, and the dry coherent extrudate was expanded uniaxially in the longitudinal direction 4.0 times its original length by passing the dry coherent extrudate over a series of rotating heated rollers at a temperature of 300° C. The sheet was subsequently subjected to an amorphous locking step by passing the sheet over a series of rotating heated rollers at a temperature of 385° C. such that the material was in contact with the rollers for about 12 seconds.

This material formed a relatively course expanded structure such as that shown in FIG. 4.

EXAMPLE 2

Another sheet of the present invention was produced in the same manner as Example 1 except for the following differences:

The volume of mineral spirits used per gram of fine powder PTFE resin was 0.297 cc/gm. The compound was compressed into a billet and extruded through a 1.52 mm gap die attached to a ram type extruder to form a coherent extrudate. A reduction ratio of 70:1 was used.

Subsequently, the odorless mineral spirit was volatized and removed. Three layers of the dry coherent extrudate were then stacked and expanded uniaxially in the longitudinal direction 4.6 times its original length by passing the dry coherent extrudate over a series of rotating heated rollers at a temperature of 310° C. The sheet was subsequently subjected to an amorphous locking step by passing the sheet over a series of rotating heated rollers at a temperature of 385° C. for about 40 seconds.

Again, this material formed a relatively course expanded structure such as that shown in FIG. 4.

EXAMPLE 3

A sheet of the present invention was produced in the following manner:

A fine powder PTFE resin was combined with an odorless mineral spirit. The volume of mineral spirits used per gram of fine powder PTFE resin was 0.275 cc/gm. This mixture is aged below room temperature to allow for the mineral spirits to become uniformly distributed within the PTFE fine powder resin. This mixture was compressed into a billet and extruded at approximately 8300 kPa through a 0.71 mm gap die attached to a ram type extruder to form a coherent extrudate. A reduction ratio of 75:1 was used.

The extrudate is then rolled down between two metal rolls which were heated to between 30°–40° C. The final thickness after roll down was 0.20 mm. The material was transversely expanded at a ratio of 3:1 and then the mineral spirits were removed from the extrudate by heating the mass to 240° C. (i.e., a temperature where the mineral spirits were highly volatile). The dried extrudate was transversely expanded at 150° C. at a ratio of 3.5:1. After expansion, the sheet was amorphously locked at greater than 340° C. and cooled to room temperature. This material forms a relatively fine expanded structure such as that shown in FIG. 3.

Multiple layers of this sheet material can then be stacked, placed under pressure, and exposed to a temperature of about 360° C. for about 30 minutes to bond the layers into a cohesive sheet of virtually any desired thickness.

EXAMPLE 4

Layered expanded PTFE material similar to that described in Example 3 above is commercially available from W. L. Gore & Associates, Inc., Elkton, Md., as a sheet gasket material under the trademark GORE-TEX GR® sheet gasketing. This material is available in different thicknesses (i.e., constituting different number of layers formed into cohesive sheets). In order to test the effectiveness of the material of the present invention as compared to commercially available light reflectant materials, various samples of sheet gasketing material were tested as follows:

Sample 1: A composite sheet comprising about 15 layers of expanded PTFE sheets with the following properties:
Thickness: 0.5 mm
Density: 0.60 g /cc
Sample 2: A composite sheet comprising about 25 layers of expanded PTFE sheets with the following properties:
Thickness: 1.0 mm
Density: 0.57 g /cc
Sample 3: A composite sheet comprising about 60 layers of expanded PTFE sheets with the following properties:
Thickness: 2.2 mm
Density: 0.61 g /cc
Sample 4: A composite sheet comprising about 85 layers of expanded PTFE sheets with the following properties:
Thickness: 3.4 mm
Density: 0.59 g /cc
Sample 5: A composite sheet comprising about 150 layers of expanded PTFE sheets with the following properties:
Thickness: 6.2 mm
Density: 0.51 g /cc Additionally, material similar to that described in Examples 1 and 2, above, is commercially available from W. L. Gore & Associates, Inc., as a gasket tape under the trademark GORE-TEX® gasket tape. Again, this material is available in different thicknesses. Samples of this material were tested as follows:

Sample 6: A gasket tape comprising a single layer of relatively course expanded PTFE with the following properties:

Thickness: 1.0 mm

Density: 0.50 g /cc

Sample 7: A gasket tape comprising a single layer of relatively course expanded PTFE with the following properties:

Thickness: 3.3 mm

Density: 0.66 g /cc

Each of Samples 1 through 7 were tested in the following manner to quantify their reflective properties:

A 2 inch by 2 inch (51 mm×51 mm) swatch from each of Samples 1 through 7 was placed in a CARY 5E Spectrophotometer with a Labsphere integrating sphere. The spectral range measured was 175 nm to 2500 nm. Data below 250 nm was not reported due to the unreliability of the standard material below this value. All measurements were made in the double-beam mode with the same working standard in the sphere's reference reflectance port. The reflectance standard used was of SPECTRALON material, Labsphere Serial Number SRS-99-010-8111-A. Photomultiplier detection was used below 800 nm and lead sulfide detection was used above 800 nm. All measurements were normalized with respect to the baseline of the system. This data is then corrected by multiplying it by the correction factors supplied with the reflectance standard. This data was then averaged and plotted.

Figure 6:
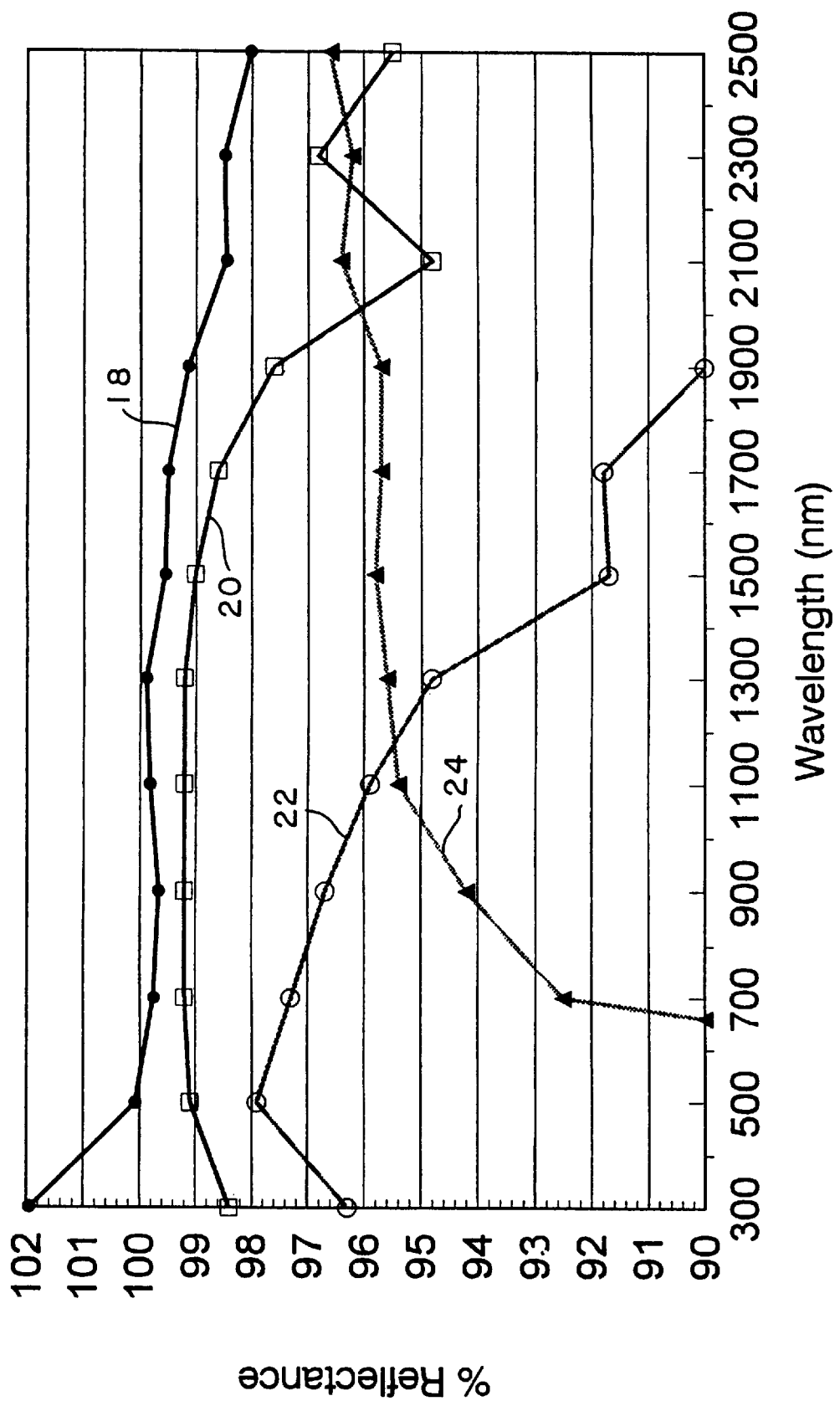
FIG. 6 is a graph plotting the reflectance verses wavelength of a reflectant material of the present invention as compared to commercially available materials.

The graph of FIG. 6 records the reflectance verses light wavelength of one sample of the present invention as compared with three commercially available reflectant materials. Line 18 is the performance of the material of Sample 5 of the present invention as compared with commercially available reflectant materials SPECTRALON (Line 20), SPECTRAFLECT (Line 22), and INFRAGOLD (Line 24), each available from Labsphere, Inc., North Sutton, N.H. These materials are represented by their manufacturer to be some of the highest diffuse reflectant materials available. The data plotted for the commercially available materials was obtained from the technical information catalog published by Labsphere, Inc. As can be seen, at all wavelengths of light tested, the reflectant material of the present invention demonstrated markedly higher reflectivity than the commercially available reflectant materials. Additionally, the material of the present invention retained its reflective properties into much higher wavelengths than the commercial materials.

It should be noted here that the reflectivity numbers reported herein are not asserted to show better than complete reflectance of light, but, rather, as demonstrating significantly better reflectance than the present state-of-the-art SPECTRALON reflectant material used as a standard.

Figure 7:
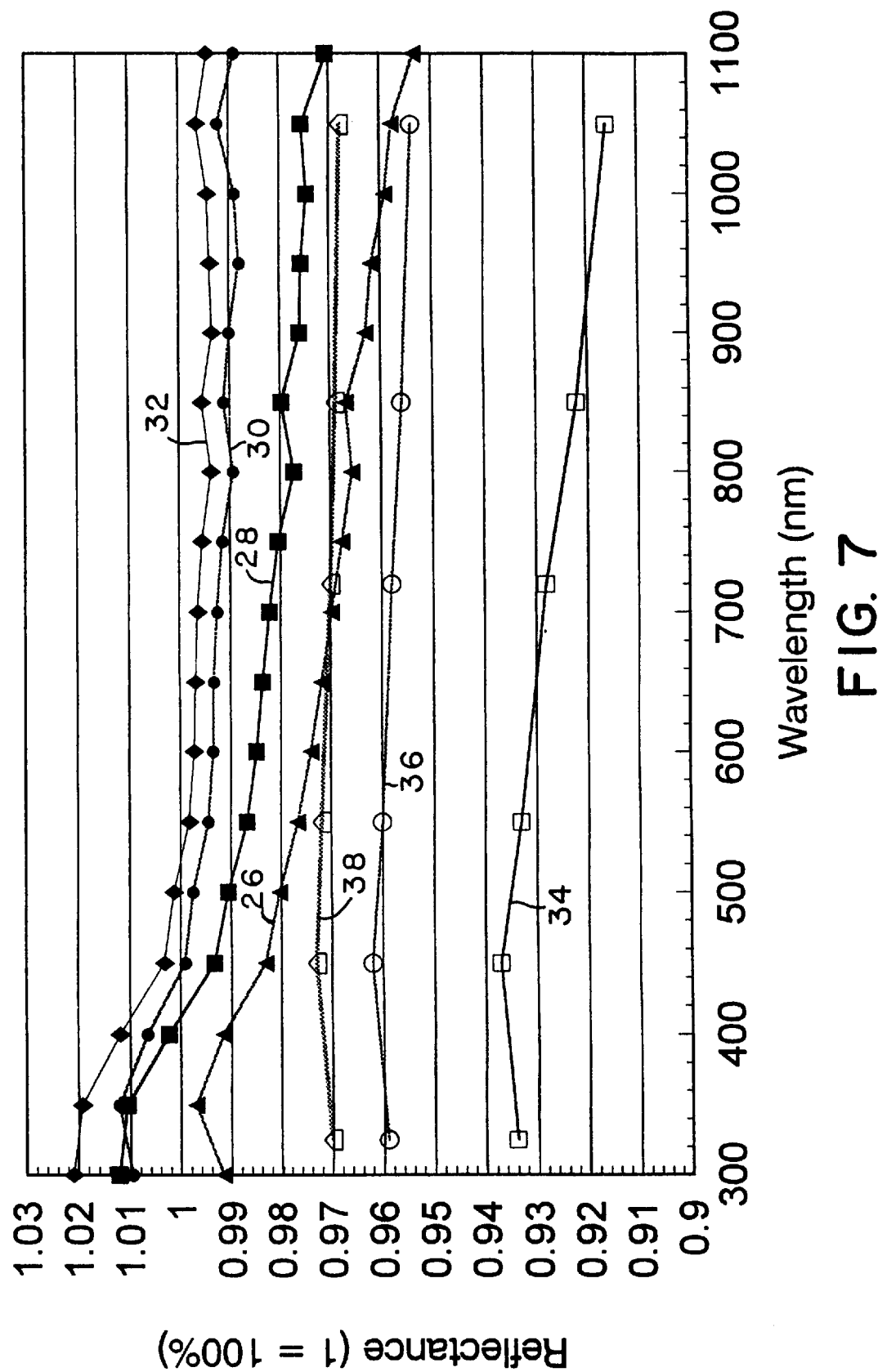
FIG. 7 is a graph plotting the reflectance verses wavelength of varying thicknesses of the reflectant material of the present invention as compared to commercially available materials.

The graph of FIG. 7 records the reflectance verses light wavelength of different thicknesses of inventive material compared to similar thicknesses of SPECTRALON reflective material. Lines 26, 28, 30, and 32 respectively represent the performance of Samples 1, 2, 3, and 4 of the present invention. By way of comparison, lines 34, 36, and 38 respectively represent the performance of 1.0 mm, 2.0 mm, and 3.0 mm thick samples of SPECTRALON material according to published data from the technical catalog of Labsphere, Inc. Sample 1 was included here even though information is not available for SPECTRALON material at a thickness of 0.5 mm. In all cases the inventive material was substantially higher in reflectivity than SPECTRALON reflectant material of similar thickness. This difference appears to be even more pronounced as the materials decrease in thickness. It should be noted that the 0.5 mm material of the present invention, even though six times thinner than the 3.0 mm SPECTRALON material, demonstrates equal to or higher reflectivity within the visible wavelengths of 400 to 700 nanometers.

As can be seen in the graph of FIG. 7, the reflectivity of inventive Samples 1, 2, 3, and 4 all demonstrate consistently greater than 95% reflectivity over the entire range of wavelengths 300 to 1100 nm and particularly in the range of visible light, 400 to 700 nm. Specifically in the range of visible light, Sample 1, line 26, comprising 0.5 mm expanded PTFE material demonstrated reflectance of about 98.2% at 420 nm, 98% at 500 nm, 97.6% at 540 nm, 97.4% at 600 nm, 97% at 640 nm, and 96.8% at 700 nm; and Sample 2, line 28, comprising 1.0 mm expanded PTFE material demonstrated reflectance of about 99.4% at 420 nm, 99% at 500 nm, 98.8% at 540 nm, 98.5% at 600 nm, 98.4% at 640 nm, and 98.2% at 700 nm. Accordingly, the expanded polytetrafluoroethylene material of the present invention at a thickness of 1.0 mm has a demonstrated diffuse reflectance of greater than 95% of light in the range of 400 to 700 nm. By contrast, a 1.0 mm sample of SPECTRALON material, line 34, demonstrated reflectivity of less than 94% in to visible light spectrum, namely 93.6% at 420 nm, 93.4% at 540 nm, and 92.8% at 720 nm.

Figure 8:
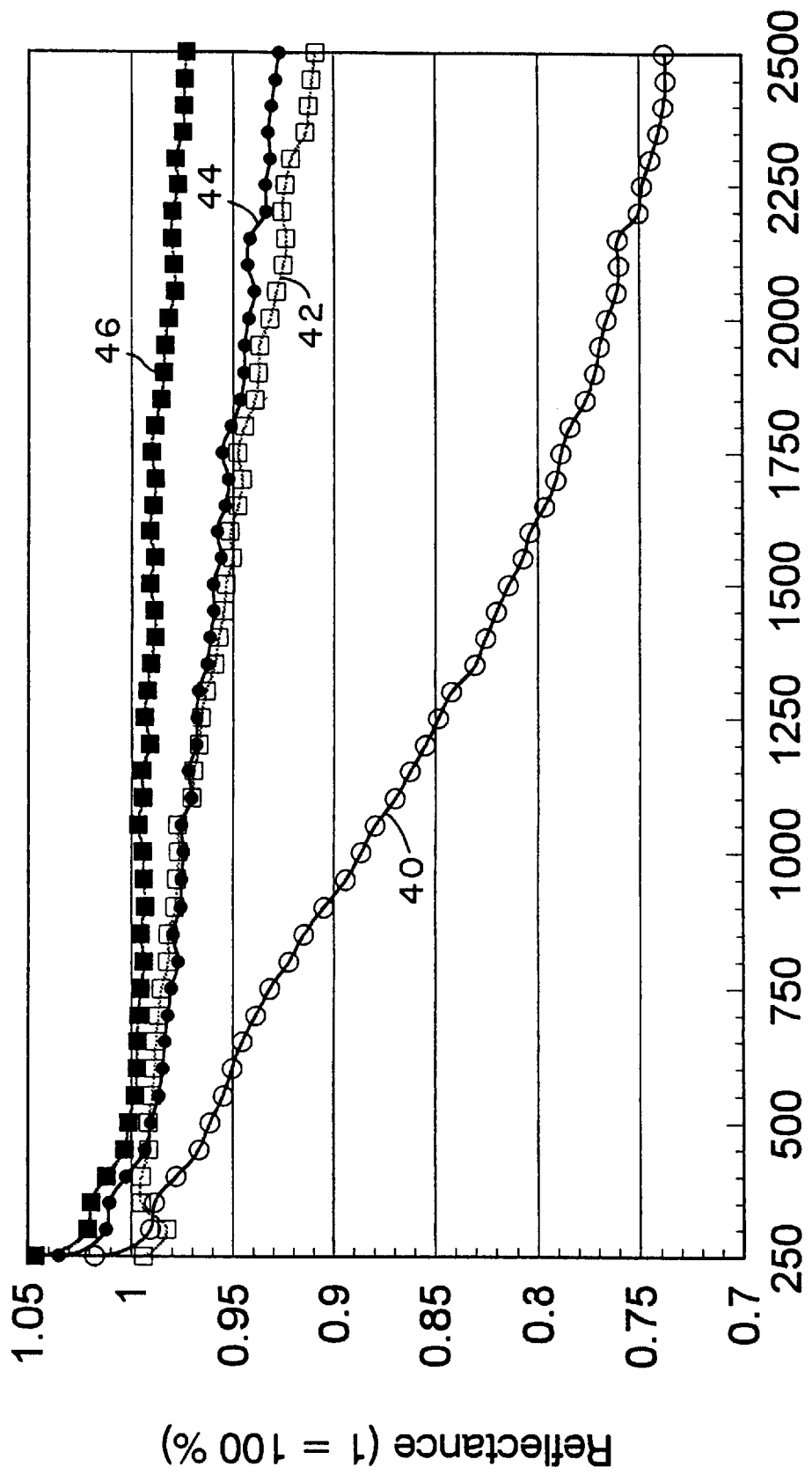
FIG. 8 is a graph plotting the reflectance verses wavelength of various structures of embodiments of the reflectant materials of the present invention.

The graph of FIG. 8 records the reflectance verses light wavelength of four samples with similar densities of expanded PTFE material of the present invention. Of the four samples, there are two different thickness levels represented, with a coarse and fine structure material at each level. Lines 40 and 42 represent Samples 6 and 7, respectively, each with a relatively coarse structure characterized by large nodes and thick fibrils. Lines 44 and 46 represent Samples 2 and 4, respectively, each having a relatively fine structure characterized by small nodes and fine fibrils.

In like thickness comparisons, the finer structure material demonstrated much higher reflectivity than the coarser structure material at all wavelengths tested. For instance, Sample 2 with a thickness of 1.0 mm was substantially more reflective than Sample 6 with the same thickness of 1.0 mm.

EXAMPLE 5

Another layered expanded PTFE material similar to that described in Example 4 was produced.

A composite sheet comprising about 7 layers of expanded PTFE sheets with the following properties:

Thickness: 0.22 mm

Density: 0.60 g/cc

EXAMPLE 6

Another layered expanded PTFE material similar to that described in Example 4 was produced:

A composite sheet comprising about 3 layers of expanded PTFE sheets with the following properties:

Thickness: 0.11 mm

Density: 0.60 g/cc

EXAMPLE 7

Another layered expanded PTFE material similar to that described in Example 4 was produced:

A composite sheet comprising about 2 layers of expanded PTFE sheets with the following properties:

Thickness: 0.07 mm

Density: 0.60 g/cc

Figure 9:
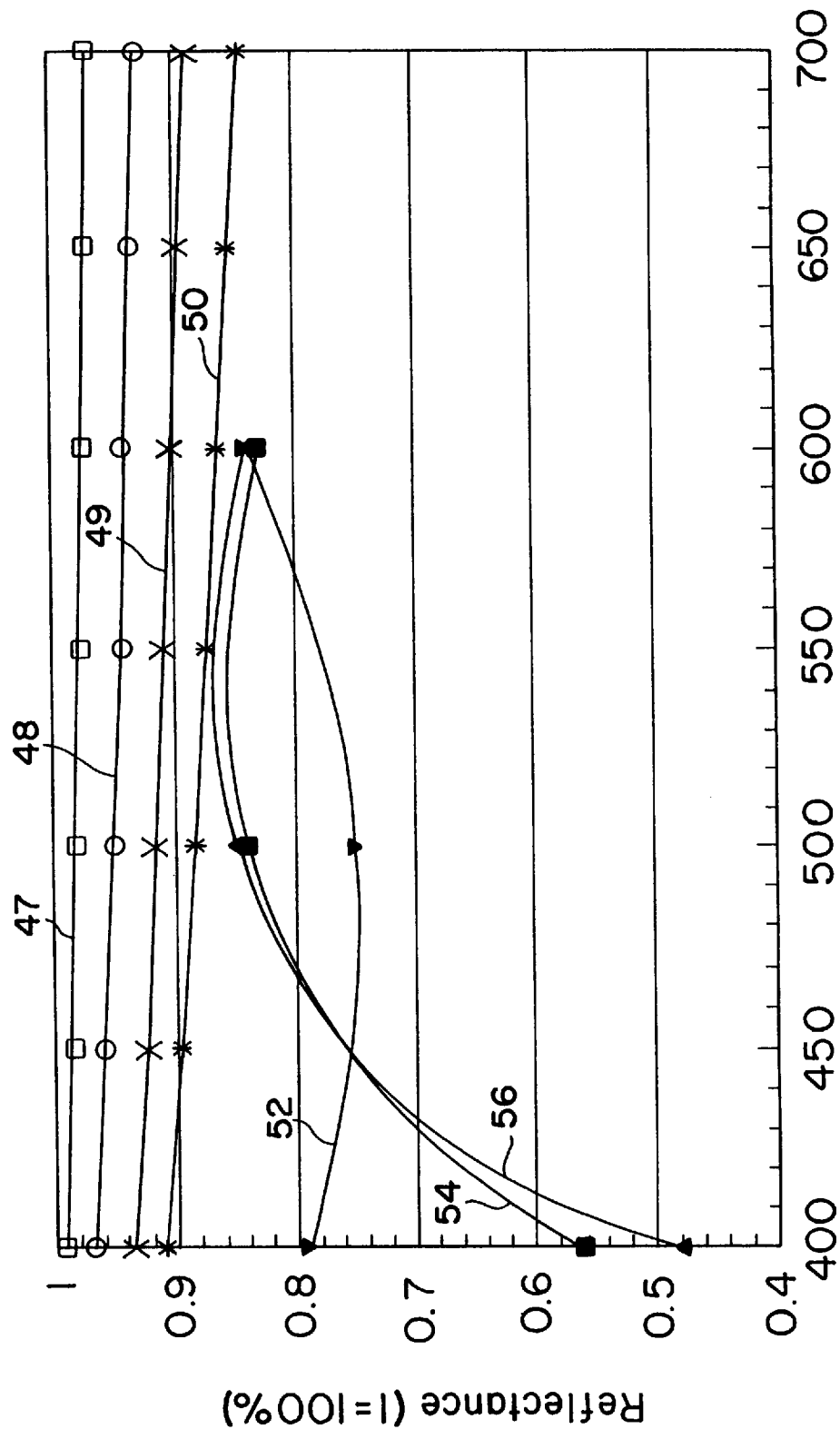
FIG. 9 is a graph plotting the reflectance verses wavelength of various thicknesses of the inventive material compared to other luminaire reflective materials.

The graph of FIG. 9 records the reflectance verses light wavelength of different thicknesses of inventive material compared to typical light reflectant materials used in luminaires. Lines 47, 48, 49, and 50 respectively represent the performance of Sample 1 from Example 4 and Examples 5, 6, and 7 of the present invention. By way of comparison, lines 52, 54, and 56 respectively represent the performance of diffuse aluminum, white porcelain enamel, and white synthetic enamel according to published data from the *LIGHTING HANDBOOK,* 8th edition, Illuminating Engineering Society of North America, page 324 (1993). In all cases the inventive material was substantially higher in reflectivity than all of the typical diffuse reflectant materials used in luminaires. It is also important to note that all of the materials of the present invention have relatively flat spectral response across the visible spectrum as compared to the typical luminaire reflectant materials. A reflectant material having a flat line response reflects all wavelengths equally thus reflecting the true color of the lamp source.

EXAMPLE 8

Figure 10:
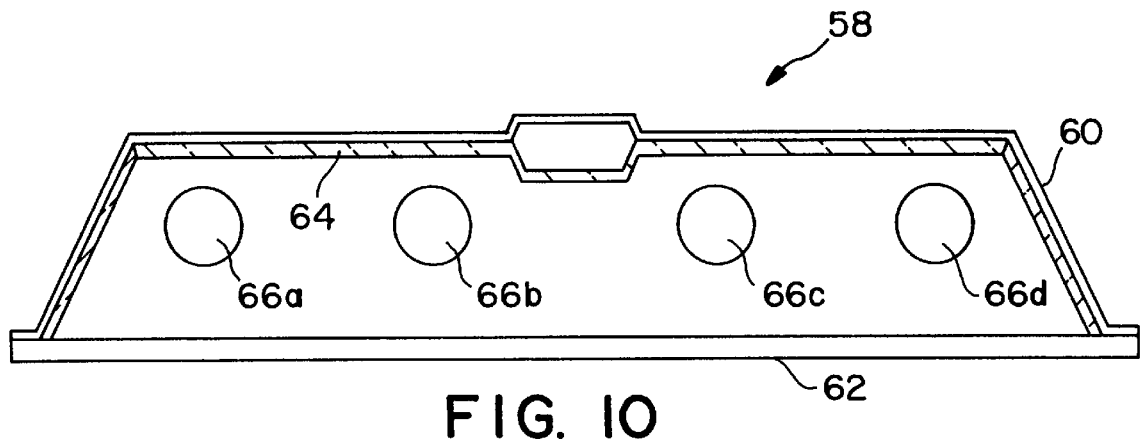
FIG. 10 is a side cross-section view of a fluorescent light fixture (luminaire) used to test the effectiveness of the present invention.

A typical recessed fluorescent light fixture is illustrated in FIG. 10. This fixture 58 comprises a troffer 60, a light permeable cover 62, a reflector 64, and multiple lights 66*a*, 66*b*, 66*c*, 66*d*. The unit shown has a 2 footx4 foot (600x 1200 mm) troffer 60 and a prismatic lens 62. This type of fixture is commercially available from Cooper Lighting of Eufaula, Ala. The fixture utilizes four 4100K T8 32 watt fluorescent lamps and electronic ballast with a reflector of diffuse white paint on aluminum.

Test Method

Figure 11:
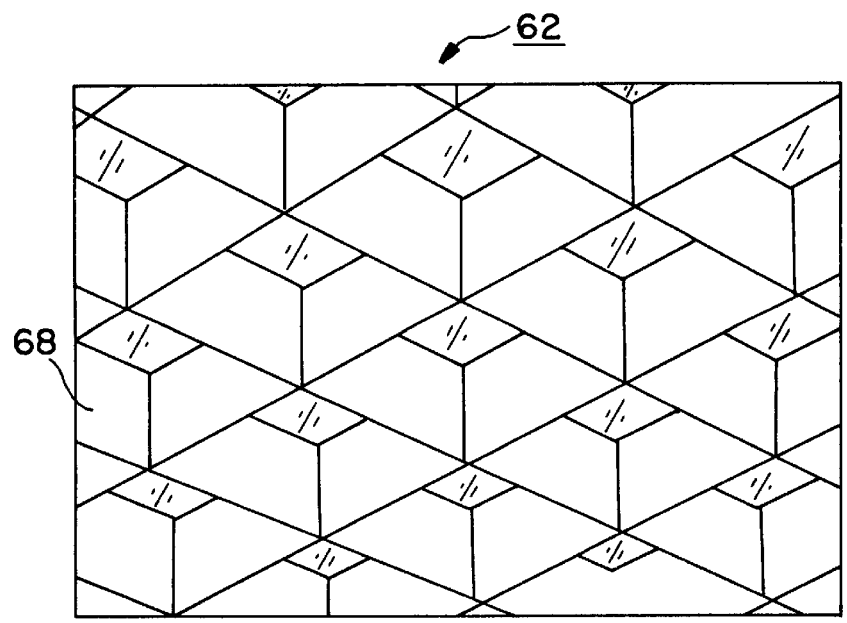
FIG. 11 is bottom plan view of a light permeable cover employing louvers.
Figure 12:
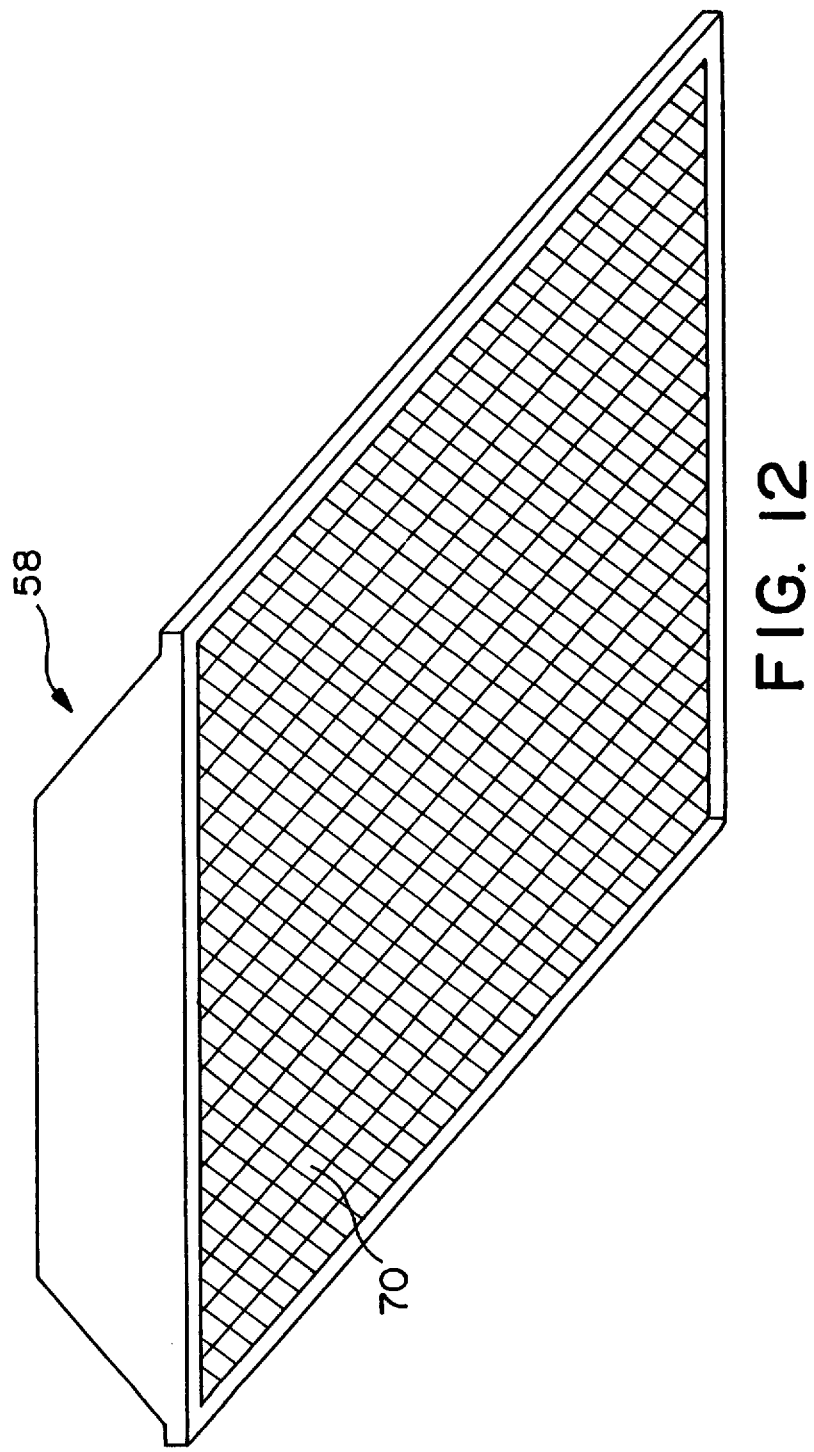
FIG. 12 is a three-quarter isometric view of a fluorescent light fixture employing a light permeable cover in the form of a lens.
Figure 13:
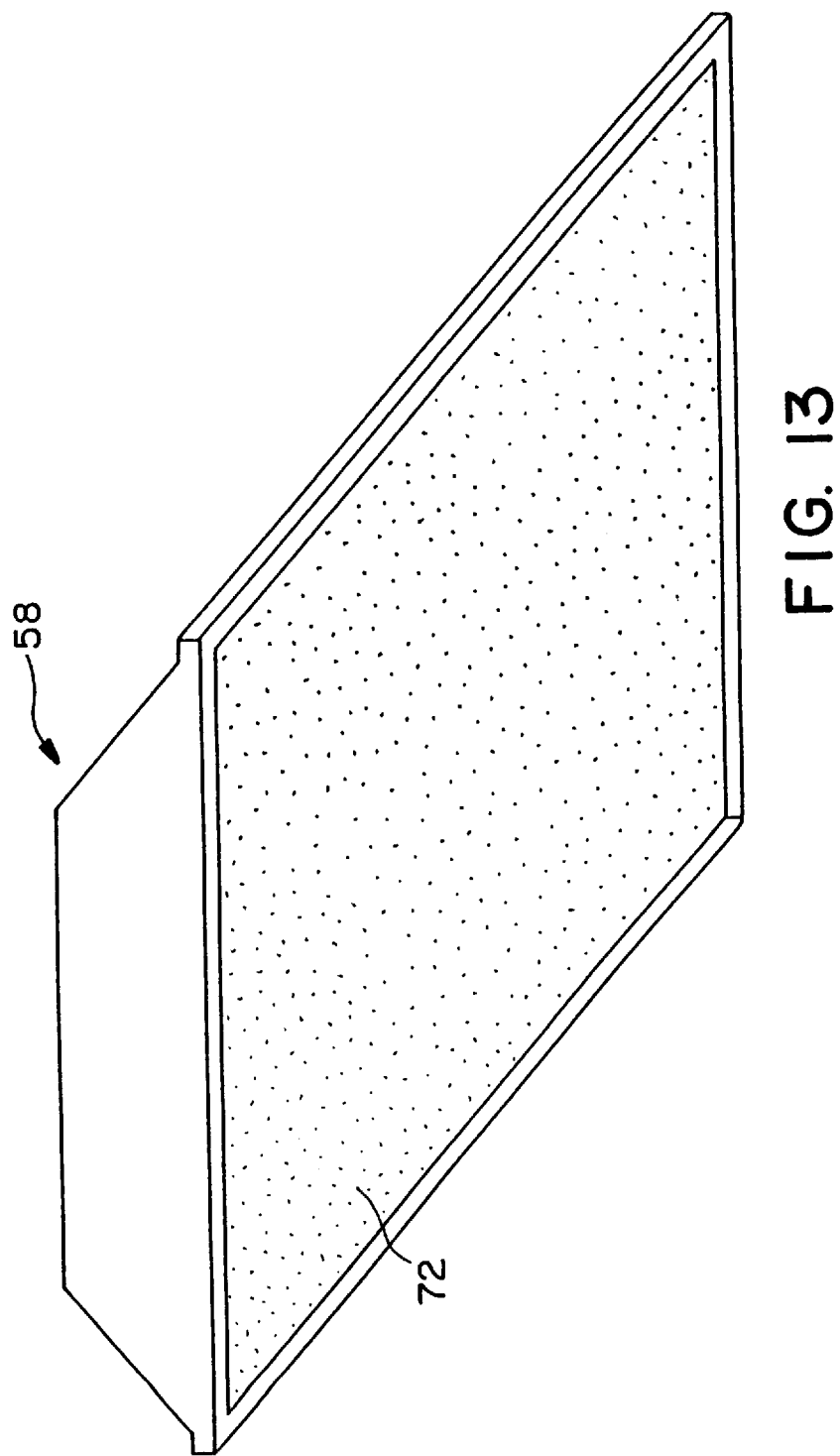
FIG. 13 is a three-quarter isometric view of a fluorescent light fixture employing a light permeable cover in the form of a diffuser sheet.

As is illustrated in FIGS. 11 through 13, a number of other light permeable covers 62 may be used with this type of fixture. FIG. 11 shows a cover 62 having numerous louvers 68 for directing light in particular directions. FIG. 12 shows a fixture 58 having a lens cover 70. The lens is provided to improve diffusion of light exiting the fixture. FIG. 13 shows a fixture 58 employing a diffuser 72. Again, the diffuser serves to provide even distribution of light exiting the fixture.

A test was conducted using the fluorescent fixture illustrated in FIG. 10. The test procedure used is set forth below.

The luminance of the luminaire was measured by positioning the lamp centered and parallel to a diffuse reflective surface (screen) as recommended by the National Lighting Product Information Program, *Specifier Reports*, Volume 3, Number 1. The screen material chosen was a 0.5 mm thick piece of the inventive material having dimensions of 152.4 cmx152.4 cm. The luminaire was placed 21.6 cm from the screen. A uniform grid of 15 by 15 squares was drawn on the screen yielding 225 total measurement locations. A radiometer probe was mounted on a stand so that the end of the probe was positioned 3.5 cm from the screen at a fixed 45 degrees angle from the screen. Measurements of each target (the center of each square of the grid) were recorded in Foot Lamberts. The probe used was a model number SPL 025Y connected to a model number IL1400 monitor both available from International Light Inc. of Newburyport, Mass. The luminance measurements began 30 minutes after the lamps were energized.

The reflector of the luminaire was then lined with 0.5 mm thick inventive material made in accordance with Sample 1 of Example 4. Strips of pressure sensitive adhesive were used to hold the inventive lining material in place. Measurements were then taken and recorded according to the above described test method.

In a further test using the ePTFE lined luminaire, one of the two center lamps was removed leaving three of the original four lamps. Measurements were again taken and recorded according to the above described test method.

Figure 14:
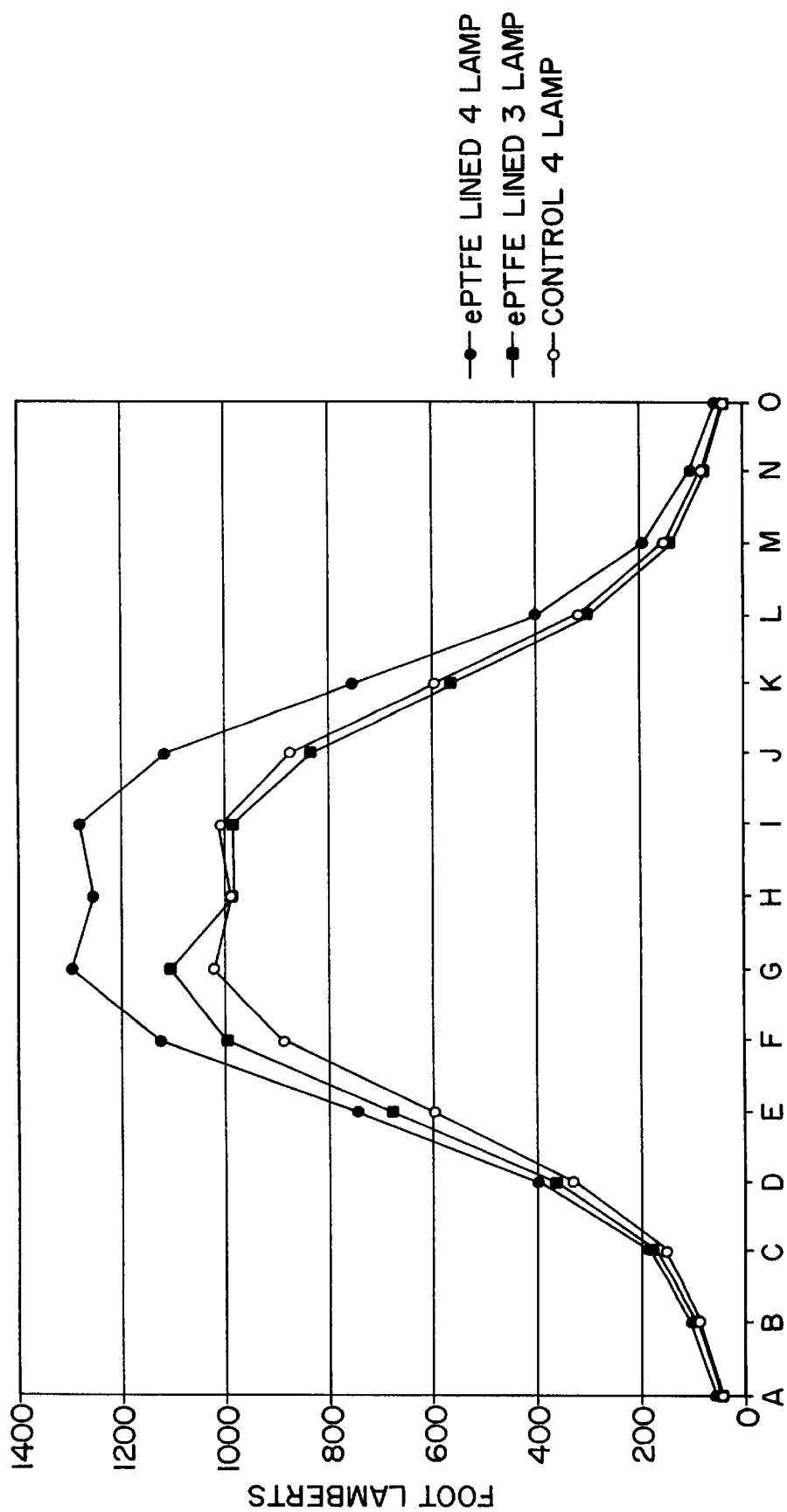
FIG. 14 is a graph plotting the data generated in the test of Example 8.

The data from the above three tests are shown in Tables 1, 2, and 3, respectively. The columns, labeled A through O, correspond to the width of the luminaire while rows 1 through 15 correspond to the length of the luminaire. The columns from Tables 1, 2, and 3 were averaged and graphed as shown in FIG. 14. Additionally, the total average luminance measurements were calculated for each test. The control had an average luminance of 478 foot lamberts. The lined four lamp luminaire had an average luminance of 604 foot lamberts, representing an increased overall luminance of 26.4%. The lined three lamp luminaire had an average luminance of 490 foot lamberts. It is important to note that even when a lamp was removed, the average luminance showed a 2.5% increase over the control.

FIG. 14 represents the averaged columns from each of the three tests. It is important to note that for all column averages, both of the lined examples exceeded those of the control. Comparing the control test with the ePTFE lined four lamp test, the only difference was the addition of the ePTFE reflective liner. Between these two tests, all column averages showed a similar level percentage increase with each column having a luminance increase greater than 20%. Thus there was an overall increase in luminance of the luminaire, but there was a minimal effect on the light distribution pattern of the luminaire.

EXAMPLE 9

A test was conducted to determine luminance output of a Cobra Style Highway luminaire catalog #M2RR15S1N2AMS3099 commercially available from GE Lighting Systems of Hendersonville, N.C., with a prismatic lens and 150 watt lamp. This luminaire utilized a reflector material of diffuse aluminum.

The test method from Example 8 was repeated with the Cobra luminaire being 17.8 cm from the screen. The reflector of the luminaire was then lined with 1.0 mm thick inventive material made in accordance with Sample 2 of Example 4. Strips of pressure sensitive adhesive were used to hold the inventive lining material in place. Measurements were then taken and recorded according to the above described test method.

Figure 15:
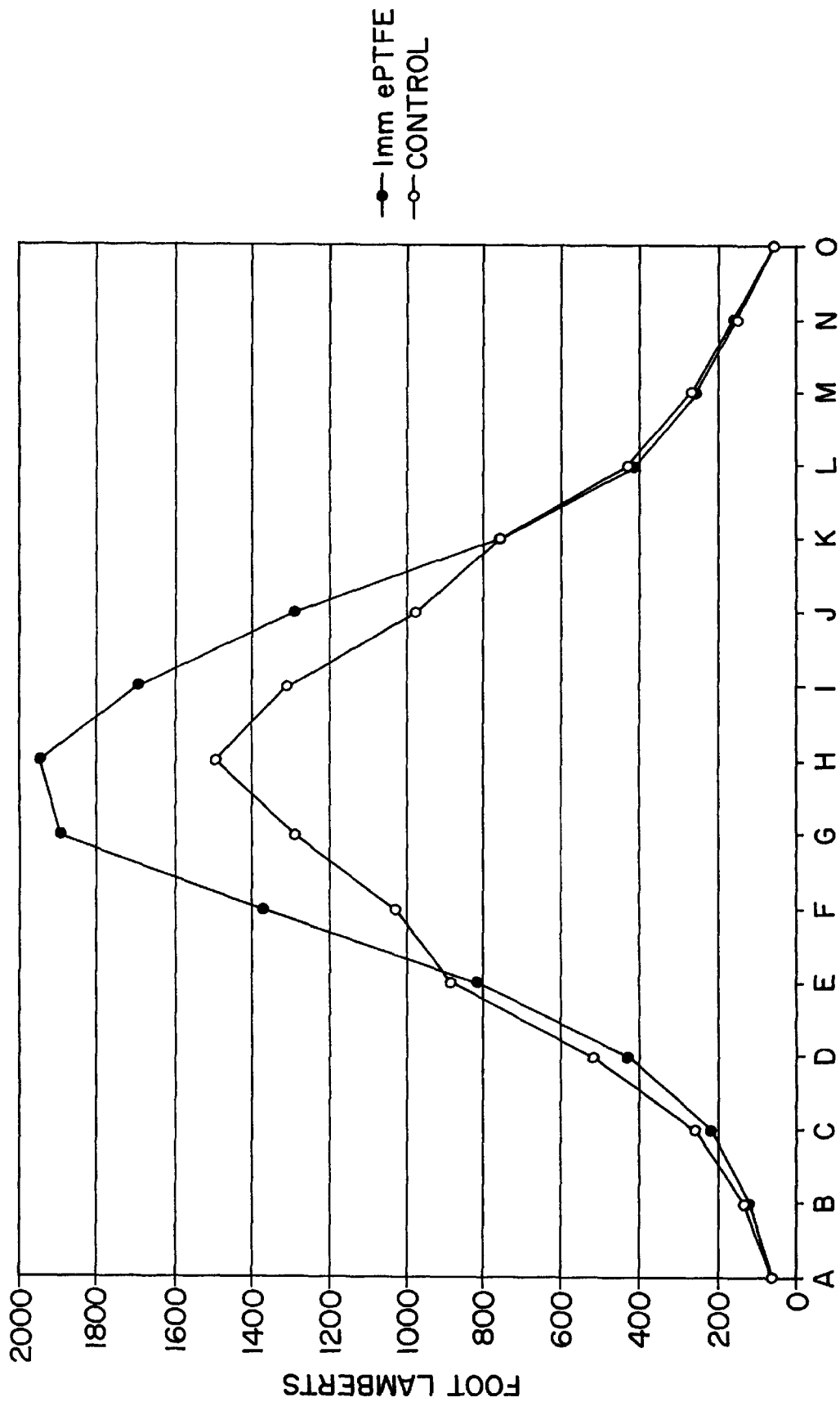
FIG. 15 is a graph plotting the date generated in the test of Example 9.

The data from the above two tests are shown in Tables 4 and 5, respectively. The columns, labeled A through 0, correspond to the width of the luminaire while rows 1 through 9 correspond to the length of the luminaire. The columns from tables 5 and 6 were averaged and graphed as shown in FIG. 15. Additionally, the total average luminance measurements were calculated for each test. The control had an average luminance of 639 foot lamberts. The ePTFE lined luminaire had an average luminance of 763 foot lamberts, representing an increased overall luminance of 19.4%.

FIG. 15 represents the averaged columns from each of the two tests. It is important to note that for this application, the centermost columns experienced a large percentage increase in luminance, whereas the outermost columns did not have an increase, with some of these outermost columns showing a small decrease. Thus, there was an overall increase luminance of the luminaire, however in this example the light distribution pattern was modified to enhance the centermost region of the lighting area.

The above Examples demonstrate that the reflectant material of the present invention performs far better and more consistently as a diffuse reflectant material over a wider spectrum of light than the best diffuse reflectant materials used for luminaires.

While particular embodiments of the present invention have been illustrated and described herein, the present invention should not be limit tosuch illustrations and descriptions. It should be apparent that changes and modifications may be incorporated and embodied as part of the present invention within the scope of the following claims.

TABLE 1

CONTROL - STANDARD WHITE PAINTED ALUMINUM REFLECTOR (AS PURCHASED)

|  | A | B | C | D | E | F | G | H | I | J | K | L | M | N | O |
|---|---|---|---|---|---|---|---|---|---|---|---|---|---|---|---|
| 1 | 30 | 45 | 68 | 107 | 182 | 229 | 256 | 284 | 271 | 231 | 169 | 112 | 69 | 43 | 32 |
| 2 | 36 | 56 | 96 | 189 | 341 | 494 | 570 | 566 | 556 | 476 | 332 | 183 | 96 | 58 | 36 |
| 3 | 42 | 75 | 125 | 271 | 504 | 773 | 888 | 858 | 869 | 753 | 512 | 278 | 133 | 72 | 39 |
| 4 | 52 | 87 | 150 | 343 | 628 | 974 | 1124 | 1082 | 1116 | 963 | 652 | 343 | 158 | 84 | 45 |
| 5 | 56 | 99 | 183 | 381 | 718 | 1107 | 1265 | 1210 | 1262 | 1100 | 750 | 392 | 174 | 94 | 48 |
| 6 | 64 | 106 | 189 | 423 | 762 | 1172 | 1355 | 1306 | 1339 | 1160 | 790 | 422 | 197 | 101 | 51 |
| 7 | 60 | 113 | 194 | 451 | 811 | 1211 | 1400 | 1340 | 1390 | 1199 | 820 | 437 | 208 | 104 | 48 |
| 8 | 60 | 111 | 188 | 460 | 835 | 1237 | 1429 | 1370 | 1405 | 1215 | 831 | 430 | 206 | 103 | 47 |
| 9 | 55 | 115 | 194 | 475 | 846 | 1228 | 1408 | 1351 | 1396 | 1206 | 829 | 417 | 209 | 101 | 48 |
| 10 | 45 | 103 | 192 | 432 | 793 | 1200 | 1378 | 1320 | 1365 | 1175 | 795 | 430 | 193 | 105 | 43 |
| 11 | 44 | 92 | 177 | 413 | 770 | 1130 | 1307 | 1260 | 1296 | 1118 | 750 | 402 | 186 | 94 | 48 |
| 12 | 39 | 84 | 157 | 369 | 687 | 1002 | 1142 | 1105 | 1141 | 1002 | 676 | 357 | 163 | 89 | 34 |
| 13 | 33 | 75 | 128 | 285 | 551 | 794 | 922 | 891 | 884 | 772 | 513 | 283 | 135 | 73 | 28 |
| 14 | 26 | 59 | 103 | 196 | 352 | 502 | 580 | 577 | 568 | 493 | 330 | 193 | 95 | 57 | 24 |
| 15 | 20 | 42 | 66 | 107 | 189 | 241 | 291 | 289 | 288 | 240 | 172 | 111 | 69 | 42 | 21 |
| Column Avg | 44 | 84 | 147 | 327 | 598 | 886 | 1021 | 987 | 1010 | 874 | 595 | 319 | 153 | 81 | 39 |

Total Avg. 478

TABLE 2

LINED WITH 0.5 MM THICK ePTFE INVENTIVE MATERIAL

|  | A | B | C | D | E | F | G | H | I | J | K | L | M | N | O |
|---|---|---|---|---|---|---|---|---|---|---|---|---|---|---|---|
| 1 | 38 | 52 | 81 | 124 | 210 | 270 | 324 | 350 | 329 | 282 | 210 | 136 | 84 | 52 | 39 |
| 2 | 45 | 66 | 112 | 216 | 416 | 623 | 738 | 719 | 717 | 620 | 422 | 231 | 116 | 71 | 46 |
| 3 | 52 | 87 | 151 | 317 | 635 | 985 | 1149 | 1103 | 1111 | 977 | 660 | 347 | 163 | 92 | 52 |
| 4 | 64 | 102 | 182 | 418 | 802 | 1244 | 1447 | 1381 | 1447 | 1260 | 847 | 438 | 204 | 109 | 63 |
| 5 | 69 | 115 | 225 | 472 | 908 | 1411 | 1627 | 1568 | 1625 | 1426 | 949 | 487 | 219 | 119 | 64 |
| 6 | 78 | 129 | 226 | 519 | 965 | 1514 | 1730 | 1660 | 1723 | 1499 | 1000 | 519 | 241 | 126 | 67 |
| 7 | 73 | 134 | 231 | 542 | 1020 | 1561 | 1780 | 1709 | 1788 | 1547 | 1038 | 546 | 259 | 131 | 69 |
| 8 | 76 | 132 | 228 | 553 | 1038 | 1575 | 1800 | 1734 | 1803 | 1559 | 1053 | 544 | 263 | 136 | 73 |
| 9 | 67 | 138 | 233 | 567 | 1032 | 1562 | 1779 | 1720 | 1773 | 1545 | 1045 | 522 | 262 | 131 | 75 |
| 10 | 64 | 130 | 233 | 529 | 986 | 1518 | 1735 | 1668 | 1718 | 1493 | 1000 | 537 | 243 | 132 | 60 |
| 11 | 56 | 115 | 222 | 506 | 935 | 1425 | 1633 | 1570 | 1618 | 1400 | 932 | 485 | 234 | 114 | 59 |
| 12 | 49 | 104 | 190 | 450 | 839 | 1246 | 1426 | 1386 | 1415 | 1232 | 823 | 444 | 209 | 105 | 43 |
| 13 | 37 | 89 | 161 | 353 | 681 | 988 | 1151 | 1100 | 1099 | 965 | 643 | 366 | 180 | 93 | 41 |
| 14 | 35 | 78 | 131 | 242 | 448 | 634 | 744 | 741 | 716 | 622 | 424 | 245 | 129 | 76 | 35 |
| 15 | 31 | 57 | 87 | 136 | 244 | 315 | 396 | 402 | 358 | 305 | 236 | 143 | 91 | 55 | 31 |
| Column Avg | 56 | 102 | 180 | 396 | 744 | 1125 | 1297 | 1254 | 1283 | 1115 | 752 | 399 | 193 | 103 | 54 |

Total Avg. 604

TABLE 3

LINED WITH 0.5 MM THICK ePTFE INVENTIVE MATERIAL WITH 1 OF 4 LAMPS REMOVED

|  | A | B | C | D | E | F | G | H | I | J | K | L | M | N | O |
|---|---|---|---|---|---|---|---|---|---|---|---|---|---|---|---|
| 1 | 30 | 41 | 70 | 115 | 188 | 247 | 274 | 283 | 260 | 227 | 163 | 107 | 64 | 42 | 29 |
| 2 | 36 | 57 | 99 | 204 | 374 | 556 | 633 | 589 | 533 | 450 | 322 | 172 | 88 | 54 | 34 |
| 3 | 43 | 77 | 135 | 305 | 580 | 874 | 983 | 874 | 872 | 734 | 495 | 263 | 122 | 68 | 38 |
| 4 | 53 | 91 | 163 | 394 | 737 | 1109 | 1227 | 1086 | 1095 | 936 | 627 | 326 | 144 | 77 | 45 |
| 5 | 58 | 103 | 197 | 442 | 838 | 1255 | 1394 | 1244 | 1236 | 1050 | 704 | 356 | 156 | 86 | 47 |
| 6 | 65 | 110 | 207 | 473 | 879 | 1334 | 1475 | 1314 | 1322 | 1115 | 748 | 387 | 175 | 92 | 49 |
| 7 | 60 | 115 | 211 | 501 | 927 | 1366 | 1515 | 1345 | 1358 | 1150 | 768 | 406 | 190 | 96 | 49 |
| 8 | 62 | 108 | 204 | 501 | 949 | 1387 | 1535 | 1357 | 1375 | 1160 | 786 | 401 | 188 | 98 | 52 |
| 9 | 54 | 112 | 204 | 512 | 948 | 1383 | 1521 | 1342 | 1361 | 1153 | 775 | 400 | 194 | 97 | 55 |
| 10 | 56 | 108 | 209 | 478 | 900 | 1346 | 1477 | 1284 | 1320 | 1116 | 746 | 400 | 177 | 100 | 47 |
| 11 | 59 | 97 | 195 | 457 | 863 | 1263 | 1410 | 1241 | 1243 | 1052 | 703 | 383 | 179 | 91 | 48 |
| 12 | 43 | 89 | 166 | 412 | 759 | 1111 | 1222 | 1093 | 1092 | 933 | 630 | 339 | 156 | 84 | 35 |
| 13 | 32 | 79 | 141 | 315 | 616 | 882 | 987 | 865 | 864 | 730 | 490 | 271 | 132 | 70 | 29 |
| 14 | 24 | 60 | 108 | 210 | 381 | 550 | 619 | 571 | 551 | 468 | 318 | 178 | 93 | 57 | 25 |

TABLE 3-continued

LINED WITH 0.5 MM THICK ePTFE INVENTIVE MATERIAL WITH 1 OF 4 LAMPS REMOVED

| | A | B | C | D | E | F | G | H | I | J | K | L | M | N | O |
|---|---|---|---|---|---|---|---|---|---|---|---|---|---|---|---|
| 15 | 24 | 44 | 71 | 116 | 203 | 259 | 305 | 269 | 283 | 236 | 170 | 108 | 68 | 41 | 22 |
| Column Avg | 47 | 86 | 159 | 362 | 676 | 995 | 1105 | 984 | 984 | 834 | 563 | 300 | 142 | 77 | 40 |

Total Avg. 490

TABLE 4

CONTROL - COBRA STYLE HIGHWAY LUMINAIRE

| | A | B | C | D | E | F | G | H | I | J | K | L | M | N | O |
|---|---|---|---|---|---|---|---|---|---|---|---|---|---|---|---|
| 1 | 45 | 61 | 67 | 88 | 93 | 105 | 127 | 142 | 152 | 108 | 104 | 87 | 68 | 60 | 37 |
| 2 | 65 | 93 | 125 | 221 | 263 | 258 | 300 | 420 | 359 | 250 | 260 | 163 | 110 | 80 | 53 |
| 3 | 82 | 185 | 233 | 490 | 1039 | 950 | 1020 | 1590 | 1210 | 907 | 940 | 297 | 207 | 157 | 90 |
| 4 | 93 | 294 | 658 | 1250 | 1620 | 1405 | 1850 | 3120 | 2210 | 1520 | 1306 | 934 | 617 | 350 | 90 |
| 5 | 75 | 188 | 455 | 1107 | 2030 | 2390 | 2760 | 2990 | 3020 | 2510 | 1830 | 1080 | 610 | 260 | 79 |
| 6 | 55 | 125 | 276 | 617 | 1111 | 1680 | 2750 | 2300 | 2360 | 1510 | 1060 | 578 | 342 | 177 | 50 |
| 7 | 43 | 109 | 246 | 495 | 1121 | 1660 | 1710 | 1650 | 1550 | 1370 | 839 | 453 | 252 | 108 | 41 |
| 8 | 36 | 73 | 167 | 282 | 471 | 461 | 688 | 840 | 599 | 360 | 306 | 206 | 131 | 68 | 29 |
| 9 | 28 | 47 | 69 | 90 | 179 | 343 | 413 | 413 | 331 | 237 | 140 | 82 | 59 | 44 | 26 |
| | 58 | 131 | 255 | 516 | 881 | 1028 | 1291 | 1496 | 1310 | 975 | 754 | 431 | 266 | 145 | 55 |

639

TABLE 5

LINED WITH 1.0 MM THICK ePTFE INVENTIVE MATERIAL

| | A | B | C | D | E | F | G | H | I | J | K | L | M | N | O |
|---|---|---|---|---|---|---|---|---|---|---|---|---|---|---|---|
| 1 | 40 | 56 | 64 | 90 | 108 | 122 | 133 | 143 | 141 | 128 | 109 | 91 | 68 | 56 | 33 |
| 2 | 52 | 76 | 92 | 172 | 237 | 315 | 332 | 369 | 329 | 270 | 253 | 147 | 107 | 77 | 42 |
| 3 | 57 | 117 | 147 | 274 | 450 | 730 | 982 | 1057 | 960 | 716 | 494 | 233 | 173 | 119 | 70 |
| 4 | 65 | 156 | 356 | 604 | 850 | 1360 | 1660 | 1910 | 1630 | 1240 | 779 | 507 | 336 | 224 | 79 |
| 5 | 73 | 155 | 332 | 730 | 1560 | 2770 | 3780 | 3400 | 3240 | 2650 | 1398 | 698 | 419 | 223 | 87 |
| 6 | 76 | 146 | 335 | 815 | 1650 | 2980 | 4720 | 4470 | 3930 | 2820 | 1530 | 762 | 438 | 272 | 79 |
| 7 | 57 | 139 | 314 | 680 | 1550 | 2630 | 3230 | 3410 | 2980 | 2500 | 1370 | 729 | 400 | 230 | 56 |
| 8 | 42 | 100 | 202 | 340 | 600 | 868 | 1440 | 1840 | 1345 | 817 | 562 | 350 | 220 | 149 | 41 |
| 9 | 49 | 70 | 97 | 141 | 309 | 585 | 769 | 890 | 690 | 485 | 272 | 153 | 100 | 74 | 35 |
| Column Avg | 57 | 113 | 215 | 427 | 813 | 1373 | 1894 | 1943 | 1694 | 1292 | 752 | 408 | 251 | 158 | 58 |

Total Avg. 763

The invention claimed is:

1. A method of providing improved diffuse reflectivity of light in a luminaire comprising
   providing a reflectant material comprising a structure of expanded polytetrafluoroethylene having polymeric nodes interconnected by thread-like fibrils emerging from the nodes and defining microporous voids therein, the reflectant material comprising a flexible sheet that is readily formed into different shapes; and
   mounting the reflectant material in a luminaire so as to cause light energy to reflect off it.

2. The method of claim 1 that further comprises providing as the reflectant material a material with a diffuse reflectance of greater than 85% of the light striking the reflectant material reflecting from the material.

3. The method of claim 1 that further comprises providing as the reflectant material a material with a diffuse reflectance of greater than 90% of the light striking the reflectant material reflecting from the material.

4. The method of claim 1 that further comprises providing as the reflectant material a material with a diffuse reflectance of greater than 95% of the light striking the reflectant material reflecting from the material.

5. The method of claim 1 that further comprises
   forming the reflective material to provide a non-planar reflective surface.

6. The method of claim 1 that further comprises providing an expanded polytetrafluoroethylene material that at a thickness of 1.0 mm has a diffuse reflectance of greater than 95% of light in the range of 400 to 700 nm.

7. A luminaire comprising
   at least one sheet of expanded polytetrafluoroethylene (PTFE) comprising a structure of polymeric nodes interconnected by thread-like fibrils emerging from the nodes and defining microporous voids therein, the sheet being conformable;

at least one light source mounted in the luminaire;

the sheet of expanded PTFE being mounted in the luminaire so as to provide a high diffuse reflectance of light from the luminaire.

8. The luminaire of claim 7 which further comprises, a means to redirect the light exiting the luminaire.

9. The luminaire of claim 8 where the means to redirect the light exiting the luminaire is a diffuser.

10. The luminaire of claim 8 where the means to redirect the light exiting the luminaire is a lens.

11. The luminaire of claim 8 where the means to redirect the light exiting the luminaire is a louver.

12. A luminaire of claim 6 wherein an expanded polytetrafluoroethylene material is employed that at a thickness of 1.0 mm has a diffuse reflectance of greater than 95% of light in the range of 400 to 700 nm.

* * * * *